United States Patent
Shi et al.

(10) Patent No.: US 12,148,458 B1
(45) Date of Patent: Nov. 19, 2024

(54) ASSIST CORES FOR SPOT SIZE CONVERTER FOR HEAT ASSISTED MAGNETIC RECORDING

(71) Applicant: Western Digital Technologies, Inc., San Jose, CA (US)

(72) Inventors: Norman Nan Shi, Los Altos, CA (US); Takuya Matsumoto, San Jose, CA (US); Barry C. Stipe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/354,439

(22) Filed: Jul. 18, 2023

Related U.S. Application Data

(60) Provisional application No. 63/506,884, filed on Jun. 8, 2023.

(51) Int. Cl.
| | | |
|---|---|---|
| *G11B 5/60* | (2006.01) | |
| *G02B 6/122* | (2006.01) | |
| *G11B 5/48* | (2006.01) | |
| *G11B 13/08* | (2006.01) | |
| *G11B 5/00* | (2006.01) | |

(52) U.S. Cl.
CPC .......... *G11B 5/6088* (2013.01); *G02B 6/1228* (2013.01); *G11B 5/4866* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,587,629 B1 * | 7/2003 | Maruyama | G02B 6/12004 385/132 |
| 8,077,557 B1 * | 12/2011 | Hu | G11B 5/6088 385/12 |
| 8,107,326 B1 * | 1/2012 | Hirano | G11B 5/314 369/112.27 |
| 8,264,919 B2 | 9/2012 | Komura et al. | |
| 8,406,092 B2 | 3/2013 | Tomikawa et al. | |

(Continued)

FOREIGN PATENT DOCUMENTS

| | | |
|---|---|---|
| WO | 2011162042 A1 | 12/2011 |

OTHER PUBLICATIONS

Orrathai Watcharakitchakorn et al., "Design and Modeling of the Photonic Crystal Waveguide Structure for Heat-Assisted Magnetic Recording", Advances in Materials Science and Engineering, vol. 2018, Article ID 8097841, 11 pages, 2018.

(Continued)

*Primary Examiner* — Peter Vincent Agustin
(74) *Attorney, Agent, or Firm* — PATTERSON + SHERIDAN, LLP

(57) ABSTRACT

Spot size converter (SSC) in a HAMR magnetic recording head assembly have a plurality of split assist core structures. Each split assist core structure includes multiple assist cores and a main waveguide. Each split core may also include one or more side waveguides such that the main waveguide is sandwiched between the side waveguides and top and bottom assist cores. Adjacent split assist core structures, may share assist cores. The split assist core structures reduce light source power utilized to write data to magnetic media.

21 Claims, 19 Drawing Sheets

(56) References Cited

U.S. PATENT DOCUMENTS

| | | | |
|---|---|---|---|
| 8,406,093 B2 | 3/2013 | Iwanabe et al. | |
| 8,588,039 B1 * | 11/2013 | Shi | G02B 6/12 |
| | | | 369/13.13 |
| 8,619,511 B1 | 12/2013 | Iwanabe | |
| 8,780,678 B2 | 7/2014 | Iwanabe et al. | |
| 8,897,102 B1 | 11/2014 | Lin et al. | |
| 9,047,912 B1 * | 6/2015 | Peng | G11B 5/6088 |
| 9,147,415 B2 | 9/2015 | Clinton et al. | |
| 9,195,001 B2 | 11/2015 | Hatori et al. | |
| 9,336,814 B1 | 5/2016 | Shi et al. | |
| 10,106,889 B2 | 10/2018 | Chen et al. | |
| 10,431,253 B1 | 10/2019 | McGurk et al. | |
| 11,657,845 B1 * | 5/2023 | Shi | G11B 13/08 |
| | | | 369/13.33 |
| 2006/0083461 A1 * | 4/2006 | Takahashi | G02B 6/1228 |
| | | | 385/24 |
| 2006/0143635 A1 * | 6/2006 | Liu | G11B 13/045 |
| | | | 360/59 |
| 2010/0165801 A1 * | 7/2010 | Boone, Jr. | G11B 5/4866 |
| | | | 257/E33.068 |
| 2015/0340051 A1 | 11/2015 | Tatah et al. | |
| 2021/0398556 A1 | 12/2021 | Stipe et al. | |
| 2021/0398557 A1 * | 12/2021 | Stipe | G11B 5/6088 |

OTHER PUBLICATIONS

International Search Report and Written Opinion for Application No. PCT/US2024/011519 dated May 10, 2024.

* cited by examiner

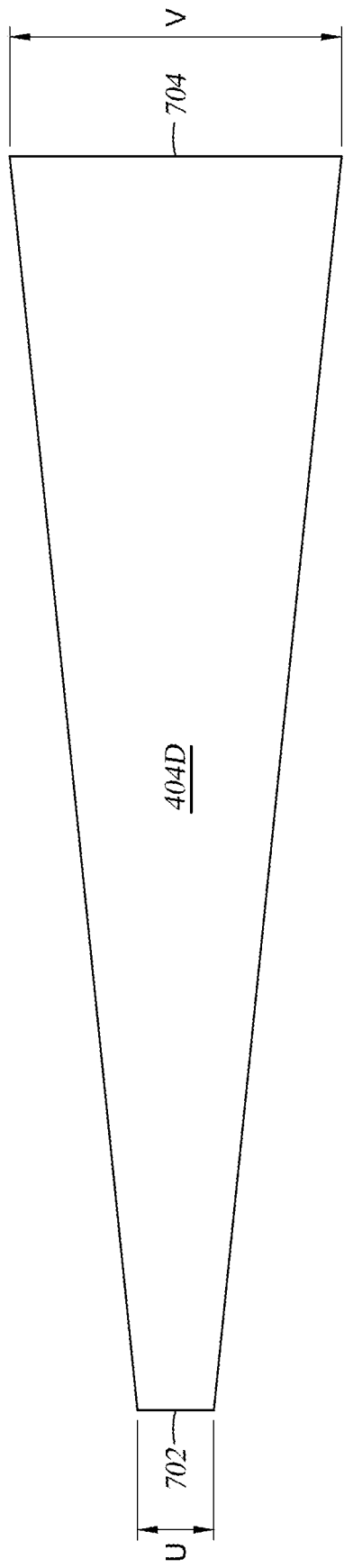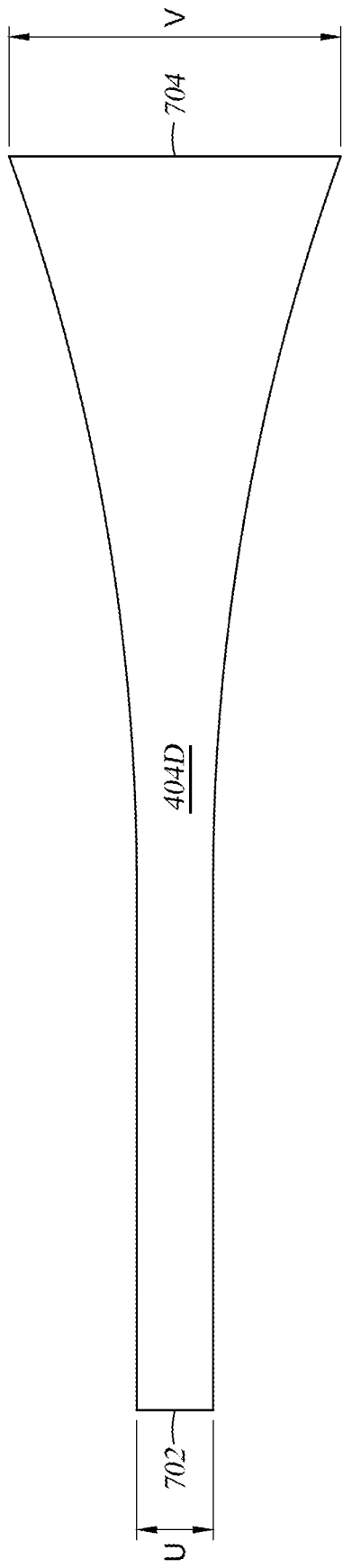

ASSIST CORES FOR SPOT SIZE CONVERTER FOR HEAT ASSISTED MAGNETIC RECORDING

CROSS-REFERENCE TO RELATED APPLICATIONS

This application claims benefit of U.S. Provisional Patent Application Ser. No. 63/506,884, filed Jun. 8, 2023, which is herein incorporated by reference.

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium.

HAMR typically utilizes an edge emitting laser diode (EELD) or a vertical cavity surface emitting laser (VCSEL) device as the light source. With either EELD or VCSEL, coupling efficiency between the light source and the waveguide structure can be challenging as light source operating temperature, light source lifetime, light source stability, and slider operating temperature can be issues.

Therefore, there is a need in the art for an improved HAMR magnetic media drive.

SUMMARY OF THE DISCLOSURE

Spot size converter (SSC) in a HAMR-based magnetic recording head assembly has a plurality of split assist core structures. Each split assist core structure includes multiple assist cores and a main waveguide. Each split assist core structure may also include one or more side waveguides such that the main waveguide is sandwiched between the side waveguides and top and bottom assist cores. Adjacent split assist core structures may share assist cores. The split assist core structures reduce light source power utilized to write data to magnetic media.

In one embodiment, a magnetic recording head assembly comprises: a main pole; a near field transducer (NFT) disposed adjacent to the main pole; and a spot size converter coupled to the NFT, wherein the spot size converter comprises: a first waveguide coupled to the NFT; a multimodal interference (MMI) device having a first end and a second end, wherein the first end is coupled to the first waveguide; and a plurality of split assist core structures coupled to the second end, wherein the plurality of split assist core structures extend from the MMI device to a top surface of the head assembly, the top surface being opposite a media facing surface (MFS) of the head assembly, and wherein each split assist core structure comprises a main waveguide and a plurality of assist cores.

In another embodiment, a spot size converter comprises: a waveguide; a multimodal interference (MMI) device having a first end and a second end, wherein the first end is coupled to the first waveguide; a first main waveguide coupled to the second end and extending to a third end opposite the second end; a second main waveguide coupled to the second end and extending to the third end; and a plurality of assist cores, wherein a first assist core of the plurality of assist cores extends from the third end towards the second end and wherein the first assist core is spaced from both the first main waveguide and the second main waveguide by cladding material.

In another embodiment, a magnetic recording head comprises: a near field transducer; and a spot size converter, comprising: a first waveguide having a first surface that is coupled with the near field transducer; a multimodal interference (MMI) device having a first end and a second end, wherein the first end is coupled to the first waveguide; and a plurality of split assist core structures comprising: a first assist core; a second assist core; and a main waveguide coupled between the first assist core and the second assist core, wherein the main waveguide extends from the second end to a surface opposite a media facing surface (MFS), and wherein the main waveguide is disposed between the first assist core and the second assist core, wherein the first assist core, the second assist core, and that main waveguide each includes a first material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 7A and 7B are schematic illustrations of waveguides having tapers according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Spot size converter (SSC) in a HAMR-based magnetic recording head assembly has a plurality of split assist core structures. Each split assist core structure includes multiple assist cores and a main waveguide. Each split assist core structure may also include one or more side waveguides such that the main waveguide is sandwiched between the side waveguides and top and bottom assist cores. Adjacent split assist core structures may share assist cores. The split assist core structures reduce light source power utilized to write data to magnetic media.

Figure 1:
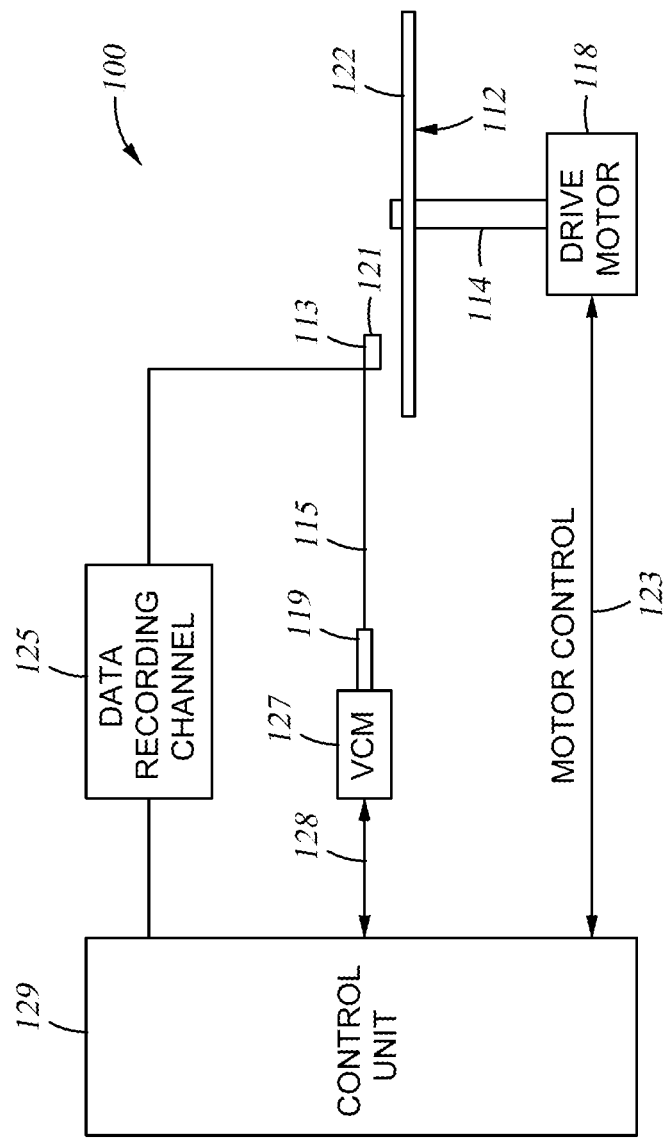
FIG. 1 is a schematic illustration of certain embodiments of a magnetic media drive including a HAMR magnetic write head.

FIG. 1 is a schematic illustration of certain embodiments of a magnetic media drive including an energy-assisted magnetic recording (EAMR) write head, such as a heat-assisted magnetic recording (HAMR. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
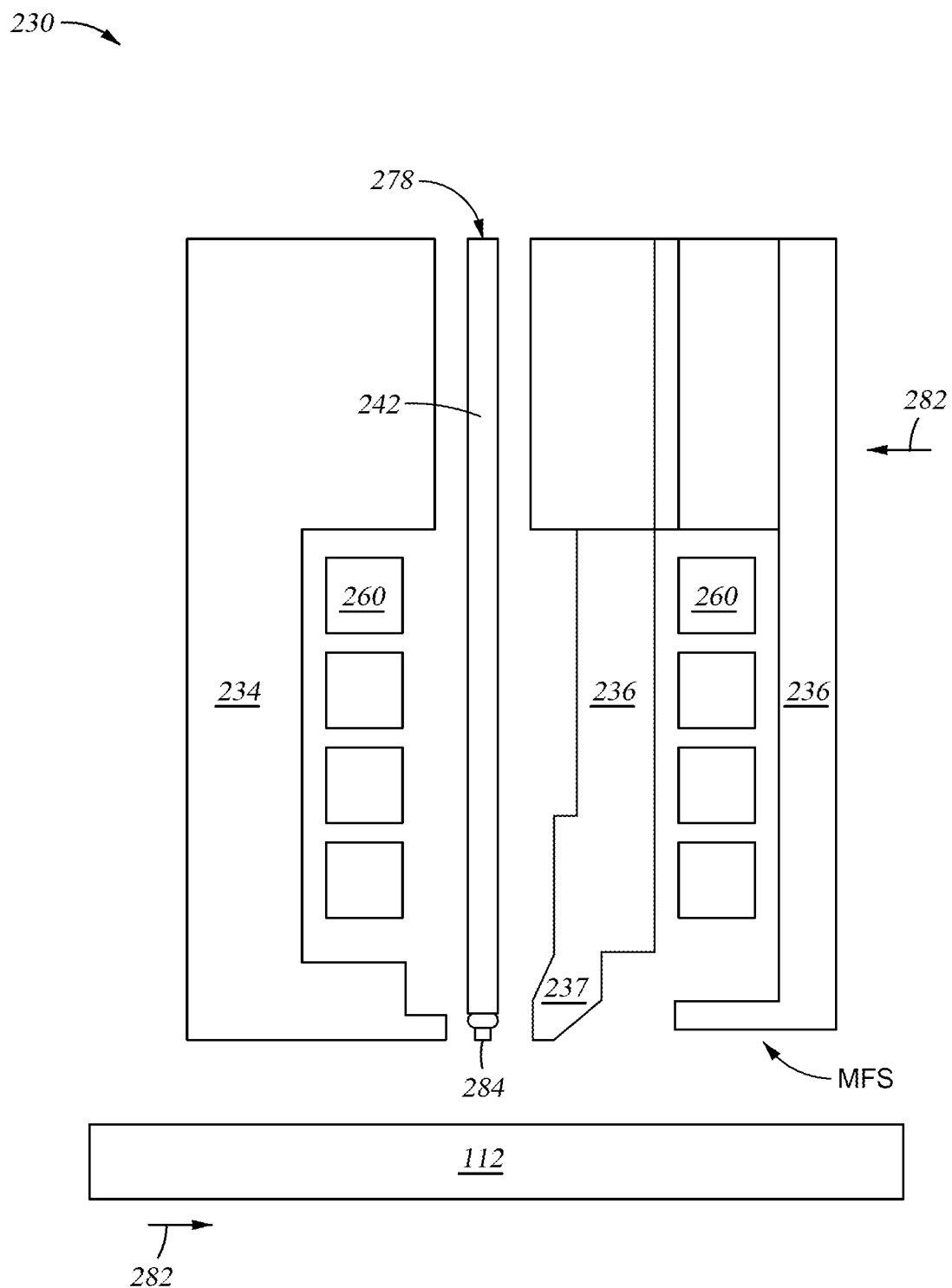
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

The waveguide 242, may include a spot size converter (SSC) that includes numerous waveguides, such as assist, side, and main waveguides, and a multimodal interference (MMI) device. The present disclosure generally relates to the management and enhancement of the profile of the SSC. At least some of the SSC embodiments discussed herein result in significant improvement in the overall coupling efficiency between a coherent light source and the waveguide inside a photonic integrated circuit (PIC) or planar waveguide circuit (PLC) of a HAMR head slider. The geometry and position of the core materials/assist core channels both on the lateral and vertical vicinity of a center waveguide core are discussed herein. The overall field profile of the SSC can be tuned to match the field profile or the mode of a coherent light source, leading to significant enhancement in the overall coupling efficiency.

Optical power from an external coherent light source (i.e., EELD, surface emitting diode laser, VCSEL device, or fiber coupled diode laser) is coupled into the NFT of the HAMR head slider through the SSC or mode converter. The basic design concept is to match the mode profile of the incoming light source and the mode profile of the PLC, both at the coupling interface, hence maximizing the overall coupling efficiency.

Figure 3:
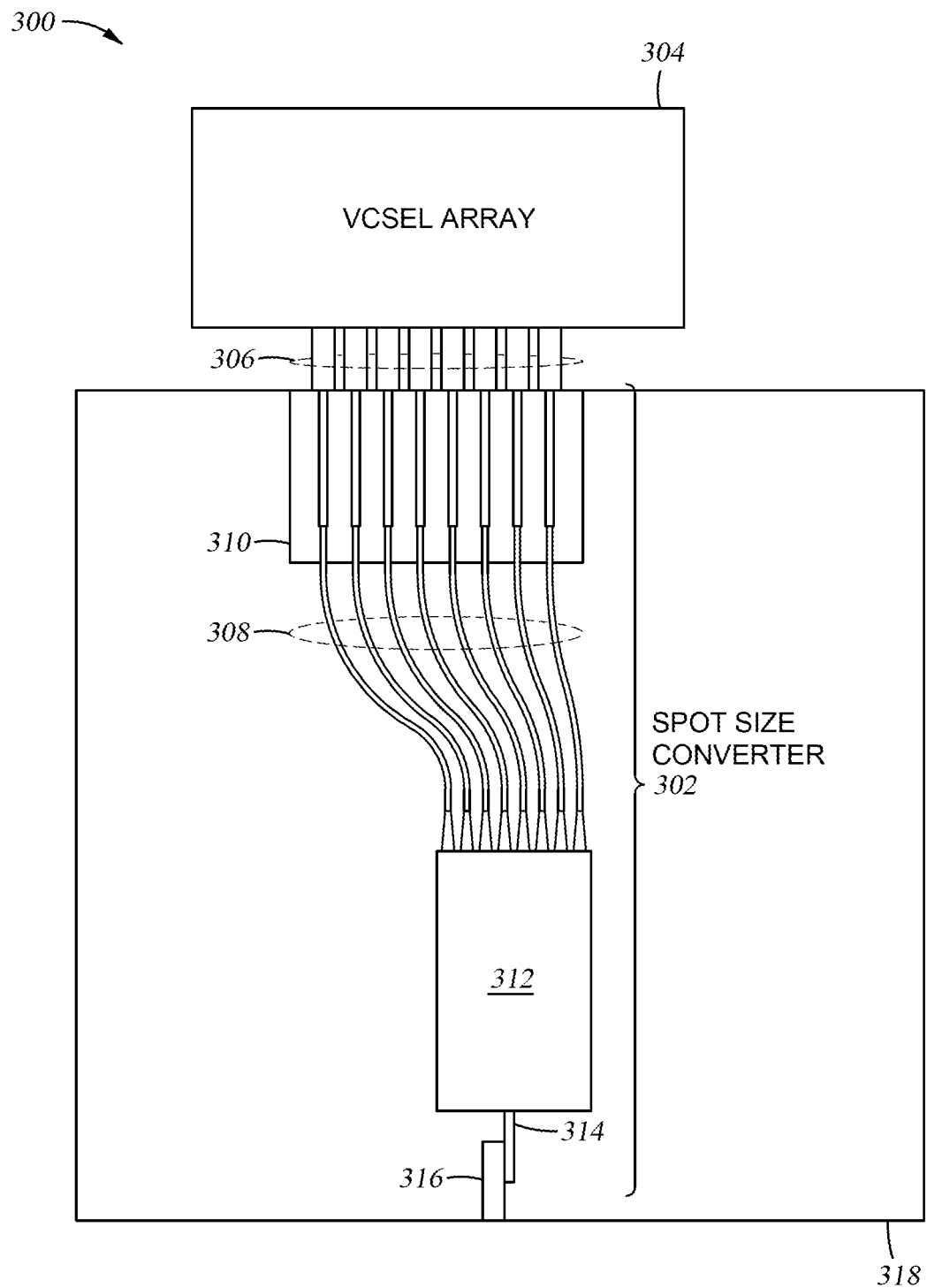
FIG. 3 is a schematic illustration of a spot size converter (SSC) in a magnetic recording head assembly.

FIG. 3 is a schematic illustration of a SSC 302 in a magnetic recording head assembly 300. The assembly 300 includes a light source 304, which as exemplified is a VCSEL array. The bottom surface of the VCSEL array 304 has laser emitters (output apertures) 306 that emit the laser light. The laser light is fed into the SSC 302 which includes a plurality of waveguides 308, a MMI device 312, and an exit waveguide 314 which may be referred to as a main waveguide in certain embodiments. The exit waveguide 314 is coupled to a NFT 316. The NFT 316 extends from the exit waveguide 314 to the MFS 318. As will be discussed below, the waveguides 308 are split cores disposed in an insulating material 310 having a lower refractive index than the split core material. In one embodiment, the waveguide 314 may comprise a split core. In another embodiment, the waveguide 314 may comprise a single core material.

The proposed design approach uses an inverse taper (narrow at the light source and then widen away from the light source) to squeeze the light from the fundamental mode of the waveguide into a large lossy mode that more closely matches the size of the mode of the incoming light source. However, the large lossy mode at the interface consists of a slowly decaying evanescent field in the transverse direction (perpendicular to the propagation direction). In order to better confine and control the decaying evanescent field profile, additional core layers/waveguides both in the lateral and vertical direction are used to confine the mode further, maximizing the mode overlap between the light source and the SSC mode profile.

As the mode is coupled into the waveguide mode, adiabatic tapers and inverse tapers, discussed below with regards to FIGS. 7A and 7B, may be used on the main waveguide core (404D below) and the side waveguide cores (404C, 404E below) to slowly transition the power from the source mode into a single confined fundamental mode inside the main waveguide core (404D below). The tapering and inverse tapering dimensions are carefully optimized to make sure the modes from the assist core waveguides are coupled into the main waveguide.

Due to laser design and configuration limitations, the far field of the laser source does not always come in at normal incidence, a small tilt could be observed in the lateral direction. In this scenario, further optimization of the overall coupling efficiency can be obtained by tilting the entire waveguide core, and the multi-channel assist cores to match this far field tilt.

By improving the overall coupling efficiency between light source and waveguide, one can expect improved laser lifetime and laser stability (operating at lower current, and lower temperature), reduced stray light, as more light is coupled into the waveguide, and opens up possibilities of additional light sources that were previously too low power. The assist cores 404A, 404B, and in some embodiments the side waveguides 404D, 404E, more efficiently couple light into the main waveguide 404D and hence, to the NFT.

Figure 4A:
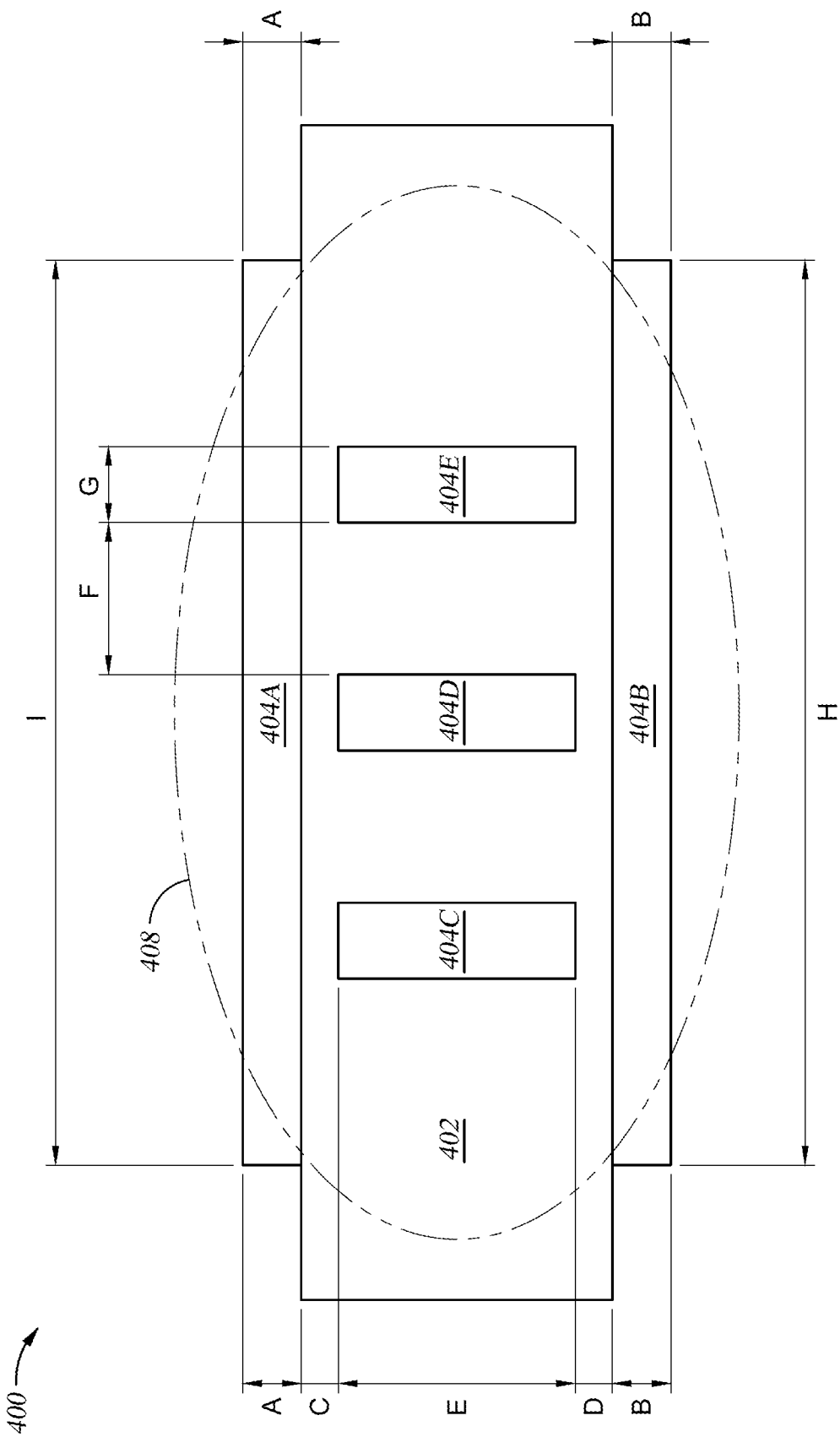
FIGS. 4A-4G are schematic cross-sectional illustrations SSCs according to various embodiments.

FIGS. 4A-4G are schematic cross-sectional illustrations of SSCs according to various embodiments. FIG. 4A illustrates a SSC 400 having a single split assist core structure 408. The SSC 400 comprises a plurality of waveguide cores 404A-404E surrounded by cladding material 402. The waveguide cores 404A-404E may be referred to as: assist core 404A, assist core 404B, side waveguide 404C, main waveguide 404D, and side waveguide 404E.

The waveguide cores 404A-404E may comprise any transparent material that has a high-refractive index that is greater than the refractive index of the cladding material. Suitable materials include $Ta_2O_5$, $TiO_2$, $Nb_2O_5$, $SiO_xN_y$, $Al_2O_3$, Ge doped $SiO_2$ (when the cladding material is $SiO_2$), or combinations thereof. A high refractive index material has an index of refraction greater than 1. It is to be understood that each waveguide core 404A-404E may have the same material or different materials or a combination whereby at least two waveguide cores 404A-404E have the same material that is different from the waveguide material for at least one other waveguide core 404A-404E. The cladding material 402 comprises a material having a lower index of refraction than the waveguide cores 404A-404E. In particular, the cladding material 402 may comprise any transparent material such as silicon oxide, silicon dioxide, silicon nitride, silicon oxynitride, $Al_2O_3$, or combinations thereof. The cladding material 402 typically comprises an electrically insulating material.

The waveguide cores 404A-404E are shown as five separate cores, of which 404A and 404B collectively form a split assist core structure 408. It is to be understood that additional cores are contemplated as are fewer cores. In the embodiment shown in FIG. 4A, the split assist core structure 408 has a top assist core 404A coupled to a top surface of the cladding material 402. The top assist core 404A has a height A extending from the top surface where A is between about 50 nm and about 150 nm, such as about 100 nm. The top assist core 404A has a length I of between about 2 um and about 10 um. Similarly, the split assist core structure 408 has a bottom assist core 404B coupled to a bottom surface of the cladding material 402. The bottom assist core 404B has a height B extending from the bottom surface where B is between about 50 nm and about 150 nm, such as about 100 nm. The bottom assist core 404B has a length H of between about 2 um and about 10 um. It is to be understood that A and B can be equal or A and B can be different. Similarly, it is to be understood that H and I can be equal or H and I can be different. As such, the top assist core 404A and the bottom assist core 404B can be substantially identical or different in material, length, and width.

FIG. 4A also illustrates three middle waveguide cores 404C-404E, which may be referred to as side waveguides or side cores or side assist cores 404C, 404E and main waveguide or main core 404D. The middle waveguides 404C-404E each has a height E extending between the top surface and bottom surface, yet spaced away from both, of the cladding material 402 where E is between about 150 nm and about 300 nm, such as about 260 nm. The middle waveguides 404C-404E each have a width G of between about 80 nm and about 250 nm, such as about 165 nm. The middle waveguides 404C-404E are spaced apart by a distance F of between about 200 nm and about 1500 nm, such as about 850 nm. The middle waveguides 404C-404E are spaced from the top surface of the cladding material 402 by a distance C of between about 50 nm and about 250 nm, such as 150 nm. The middle waveguides 404C-404E are spaced from the bottom surface of the cladding material 402 by a distance D that is between about 50 nm and about 250 nm, such as about 150 nm. It is to be understood that the middle waveguides 404C-404E can be substantially identical or different in material, length, and width. Additionally, it is to be understood that the middle waveguides 404C-404E can be spaced different distances from the top surface and bottom surface of the cladding material 402. Similarly, collectively, distances C and D can be different for not just the individual middle waveguides 404C-404E, but for the collective middle waveguides 404C-404E if the middle waveguides 404C-404E are substantially identical.

Figure 4B:
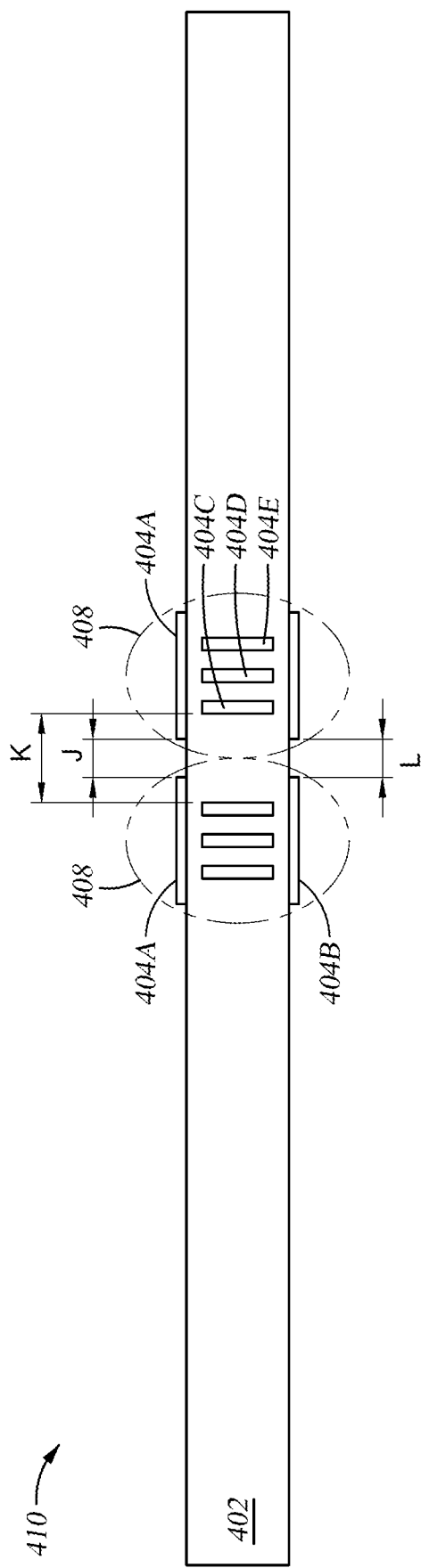

While FIG. 4A shows a single split assist core structure, FIG. 4B shows a SSC 410 having multiple split assist core structures 408. In the embodiment of FIG. 4B, there are two split assist core structures 408 that each includes a top assist core 404A, a bottom assist core 404B, and three middle waveguides 404C-404E. The split assist core structures 408 can be identical. In one embodiment, the split assist core structures 408 are different. For example, the split assist core structures 408 may have different top assist cores 404A wherein the top assist core 404A in one split assist core structure 408 may have a different material, height, and/or length than the top assist core 404A in the other split assist core structure 408. Similarly, the split assist core structures 408 may have different bottom assist cores 404B wherein the bottom assist core 404B in one split assist core structure 408 may have a different material, height, and/or length than the bottom assist core 404B in the other split assist core structure 408.

In regards to the middle waveguides 404C-404E, a similar arrangement may occur. Specifically, the middle waveguides 404C-404E may be identical in the two split assist core structures 408, but it is contemplated that the middle waveguides 404C-404E may be different. For example, the middle waveguides 404C-404E may all be identical within one split assist core structure 408 and identical within the other split assist core structure 408, but the middle waveguides 404C-404E of one split assist core structure 408 are different than the middle waveguides 404C-404E of the other split assist core structure 408 where the different can be in terms of materials, height, width, distance from upper surface of the cladding material 402, and/or distance from the bottom surface of the cladding material 402. Similarly, the individual middle waveguides 404C-404E may be different within one split assist core structure 408 and also different within the other split assist core structure 408, but the differences within the split assist core structures 408 can be identical between the split assist core structures 408 or different between the split assist core structures 408 in terms of materials, height, width, distance from upper surface of the cladding material 402, and/or distance from the bottom surface of the cladding material 402.

The split assist core structures 408 may be spaced apart by distances represented by J, K, and L where J represents the distance between an end of one top assist core 404A and the adjacent top assist core 404A and may be between about 1 um and about 5 um. K represents the distance between an end of one middle waveguide (e.g. side waveguide 404E) and an end of another middle waveguide (e.g., side waveguide 404C) of the adjacent split assist core structure 408 and may be between about 1 um and about 5 um. L represents the distance between an end of one bottom assist core 404B and the adjacent bottom assist core 404B and may be between about 1 um and about 5 um.

Figure 4C:
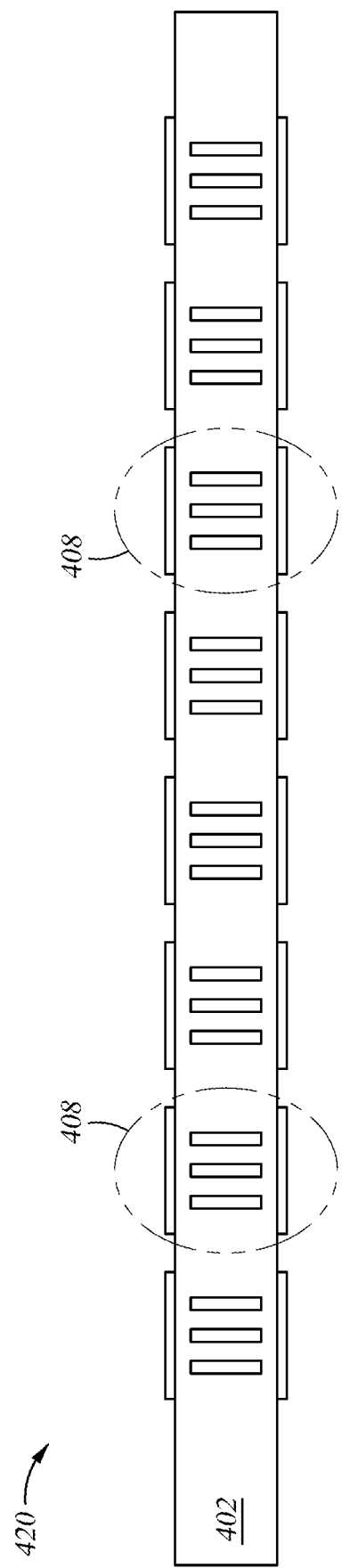

FIG. 4C goes a step further than FIG. 4B. In FIG. 4C, eight split assist core structures 408 are shown in SSC 420. It is to be understood that while eight split assist core structures 408 have been shown, more or less split assist core structures 408 are contemplated. Additionally, it is to be understood that while an even number of split assist core structures 408 are shown, an odd number of split assist core structures 408 is contemplated. The split assist core structures 408 may be arranged as described above in regards to FIG. 4B in terms of identical/different both within any split assist core structure 408 and between any other split assist core structures 408. That is to say, one or more split assist core structures 408 may be substantially identical or may be different from one or more other split assist core structures 408 in terms of top assist core 404A material, top assist core 404A length, top assist core 404A height, distance between adjacent top assist cores 404A, bottom assist core 404B material, bottom assist core 404B length, bottom assist core 404B height, distance between adjacent bottom assist cores 404B, middle waveguide 404C-404E material, middle waveguide 404C-404E number, middle waveguide 404C-404E height, middle waveguide 404C-404E width, distance between middle waveguides 404C-404E, and/or distance between middle waveguides 404C-404E in adjacent split assist core structures 408.

Figure 4D:
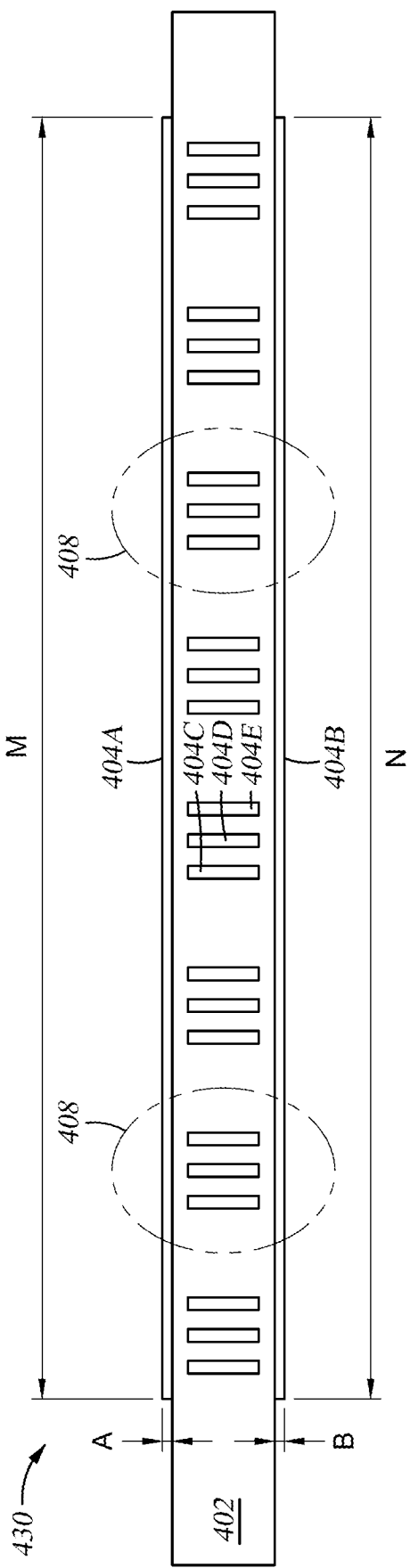

In FIG. 4D, the multiple split assist core structures 408 are different for the SSC 430 compared to FIGS. 4B and 4C. While each split assist core structure 408 still has middle waveguides 404C-404E, the split assist core structures 408 share a top assist core 404A and a bottom assist core 404B. The top assist core 404A has the height A and the bottom assist core 404B has the height B, but the top assist core 404A has a length M of between about 20 um and about 80 um. It is to be noted that the length M depends on the number of split assist core structures 408. If the number of split assist core structures 408 is less than 8, then M can be smaller. If the number of split assist core structures 408 if greater than 8, then M can be larger. Likewise, the bottom assist core 404B has a length N of between about 20 µm and about 80 um. It is to be noted that the length N depends on the number of split assist core structures 408. If the number of split assist core structures 408 is less than 8, then N can be smaller. If the number of split assist core structures 408 if greater than 8, then N can be larger. It is to be understood that M and N may be identical or different. Similarly, it is to be understood that A and B can be equal or A and B can be different. As such, the top assist core 404A and the bottom assist core 404B can be substantially identical or different in material, length, and height.

It is to be understood that while eight split assist core structures 408 have been shown, more or less split assist core structures are contemplated. Additionally, it is to be understood that while an even number of split assist core structures 408 are shown, an odd number of split assist core structures 408 is contemplated. The split assist core structures 408 may be arranged as described above in regards to FIGS. 4B and 4C in terms of identical/different both within any split assist core structure 408 and between any other split assist core structures 408. That is to say, one or more split assist core structures 408 may be different from one or more other split assist core structures 408 in terms middle waveguide 404C-404E material, middle waveguide 404C-404E number, middle waveguide 404C-404E height, middle waveguide 404C-404E width, distance between middle waveguides 404C-404E, and/or distance between middle waveguides 404C-404E in adjacent split assist core structures 408.

Figure 4E:
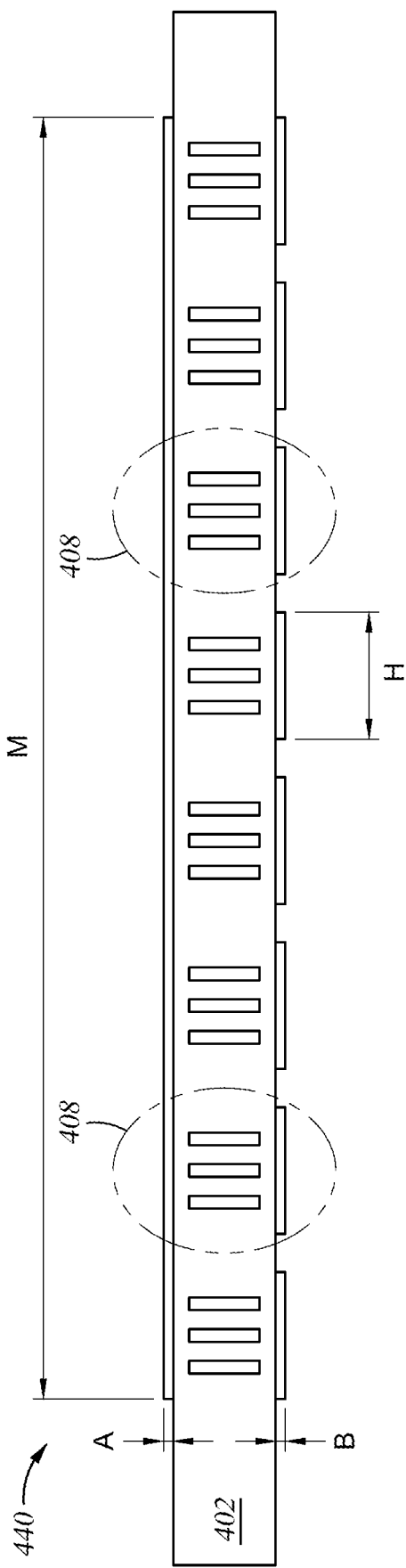

In FIG. 4E, the multiple split assist core structures 408 have a common top assist core 404A, but separate bottom assist cores 404B in SSC 440. The top assist core 404A has the height A and a length M while each bottom assist core 404B has a height B and width H. It is to be understood that A and B can be equal or A and B can be different. As such, the top assist core 404A and the bottom assist cores 404B, while being different in length, can be substantially identical or different in material and height.

It is to be understood that while eight split assist core structures 408 have been shown, more or less split assist core structures are contemplated. Additionally, it is to be understood that while an even number of split assist core structures 408 are shown, an odd number of split assist core structures 408 is contemplated. The split assist core structures 408 may be arranged as described above in regards to FIGS. 4B and 4C in terms of identical/different both within any split assist core structure 408 and between any other split assist core structures 408. That is to say, one or more split assist core structures 408 may be different from one or more other split assist core structures 408 in terms of bottom assist core 404B and middle waveguide 404C-404E material, bottom assist core 404B and middle waveguide 404C-404E number, bottom assist core 404B and middle waveguide 404C-404E height, bottom assist core 404B and middle waveguide 404C-404E width, distance between middle waveguides 404C-404E and bottom assist cores 404B, and/or distance between middle waveguides 404C-404E and bottom assist cores 404B in adjacent split assist core structures 408.

Figure 4F:
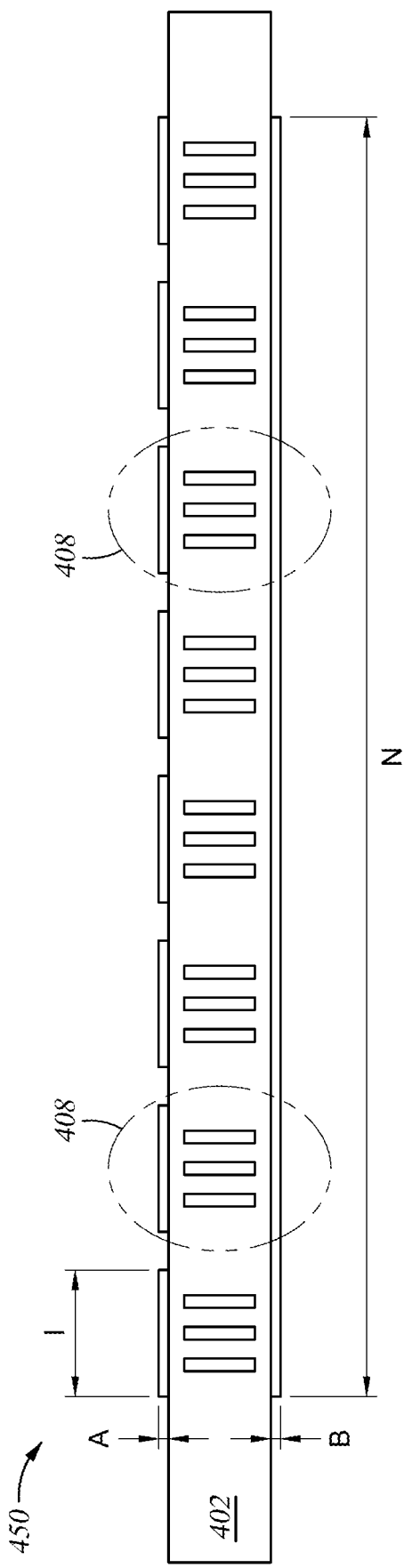

In FIG. 4F, the multiple split assist core structures 408 have a common bottom assist core 404B, but separate top assist cores 404A in SSC 450. The bottom assist core 404B has the height B and a length N while each top assist core 404A has a height A and a length I. It is to be understood that A and B can be equal or A and B can be different. As such, the top assist core 404A and the bottom assist cores 404B, while being different in length, can be substantially identical or different in material and height.

It is to be understood that while eight split assist core structures 408 have been shown, more or less split assist core structures are contemplated. Additionally, it is to be understood that while an even number of split assist core structures 408 are shown, an odd number of split assist core structures 408 is contemplated. The split assist core structures 408 may be arranged as described above in regards to FIGS. 4B and 4C in terms of identical/different both within any split assist core structure 408 and between any other split assist core structures 408. That is to say, one or more split assist core structures 408 may be different from one or more other split assist core structures 408 in terms of top assist core 404A and middle waveguide 404C-404E material, top assist core 404A and middle waveguide 404C-404E number, top assist core 404A and middle waveguide 404C-404E height, top assist core 404A and middle waveguide 404C-404E width, distance between middle waveguides 404C-404E and top assist cores 404A, and/or distance between middle waveguides 404C-404E and top assist cores 404A in adjacent split assist core structures 408.

Figure 4G:
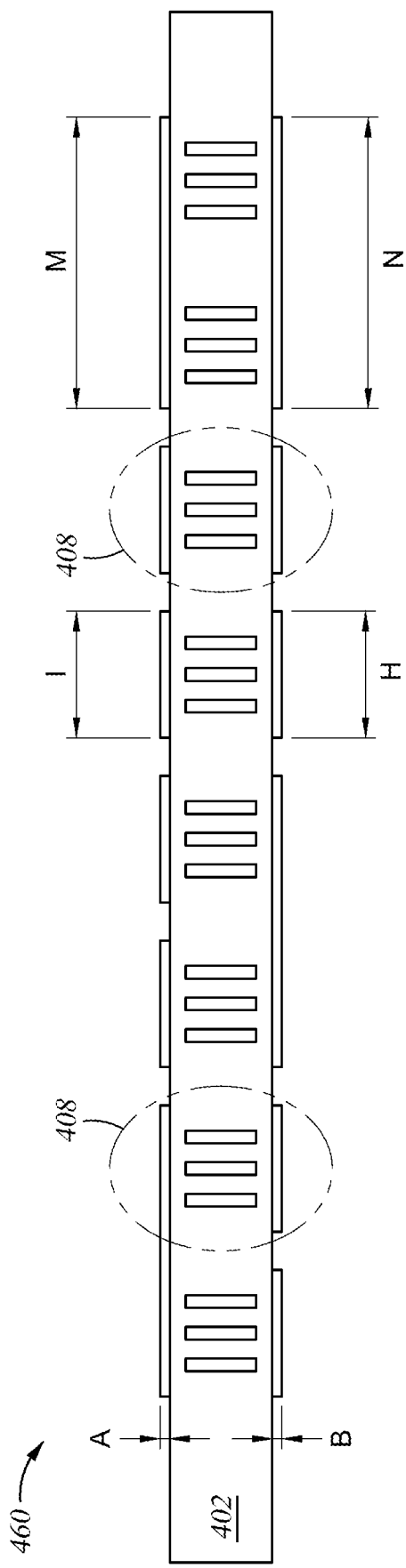

In FIG. 4G, the SSC 460 has a mixture of split assist core structures 408. Some split assist core structures 408 have common top assist cores 404A and independent bottom assist cores 404B while other split assist core structures 408 have common bottom assist cores 404B and independent top assist cores 404A. Still other split assist core structures 408 are completely independent while other split assist core structures have common top assist cores 404A and bottom assist cores 404B.

The split assist core structures 408 that share a top assist core 404A have the height A and the length M. The split assist core structures 408 that share a bottom assist core 404B have the height B and length N. The split assist core structures 408 that have independent top assist cores 404A have the height A and the length I while the split assist core structures 408 that have independent bottom assist cores 404B have the height B and the length H.

It is to be understood that A and B can be equal or A and B can be different. Likewise, it is to be understood that M and M can be equal or M and N can be different. Similarly, it is to be understood that H and I can be equal or H and I can be different. As such, the top assist core 404A and the bottom assist cores 404B, while being different in length, can be substantially identical or different in material, length and height.

It is to be understood that while eight split assist core structures 408 have been shown, more or less split assist core structures are contemplated. Additionally, it is to be understood that while an even number of split assist core structures 408 are shown, an odd number of split assist core structures 408 is contemplated. The split assist core structures 408 may be arranged as described above in regards to FIGS. 4B and 4C in terms of identical/different both within any split assist core structure 408 and between any other split assist core structures 408. That is to say, one or more split assist core structures 408 may be different from one or more other split assist core structures 408 in terms of top assist core 404A, bottom assist core 404B, and middle waveguide 404C-404E material; top assist core 404A, bottom assist core 404B, and middle waveguide 404C-404E number; top assist core 404A, bottom assist core 404B, and middle waveguide 404C-404E height; top assist core 404A, bottom assist core 404B, and middle waveguide 404C-404E width; distance between adjacent top assist cores 404A whether the top assist cores 404A are independent or shared; distance between adjacent bottom assist cores 404B whether the bottom assist cores 404B are independent or shared; distance between middle waveguides 404C-404E and top assist cores 404A; and/or distance between middle waveguides 404C-404E and top assist cores 404A in adjacent split assist core structures 408.

It is to be understood that while three middle waveguides 404C-404E are shown, more or less middle waveguides 404A-404E are contemplated. For example, it is contemplated that a single middle waveguide 404D may be present as shown in FIGS. 8A-8G. Alternatively, it is contemplated that two middle waveguides 404C, 404E may be present.

Figure 5A:
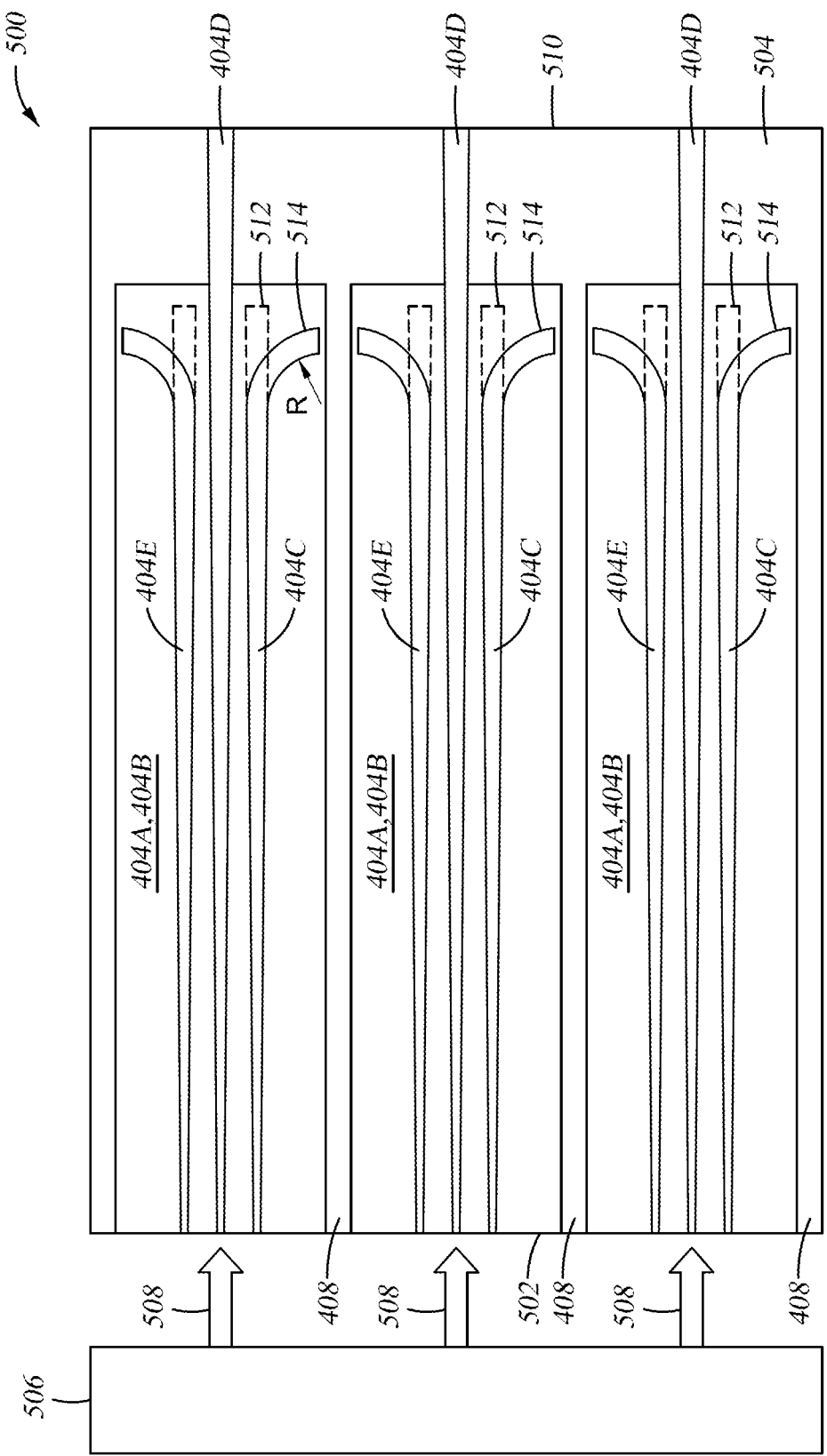
FIGS. 5A and 5B are schematic illustrations of waveguide structures according to various embodiments.
Figure 5B:
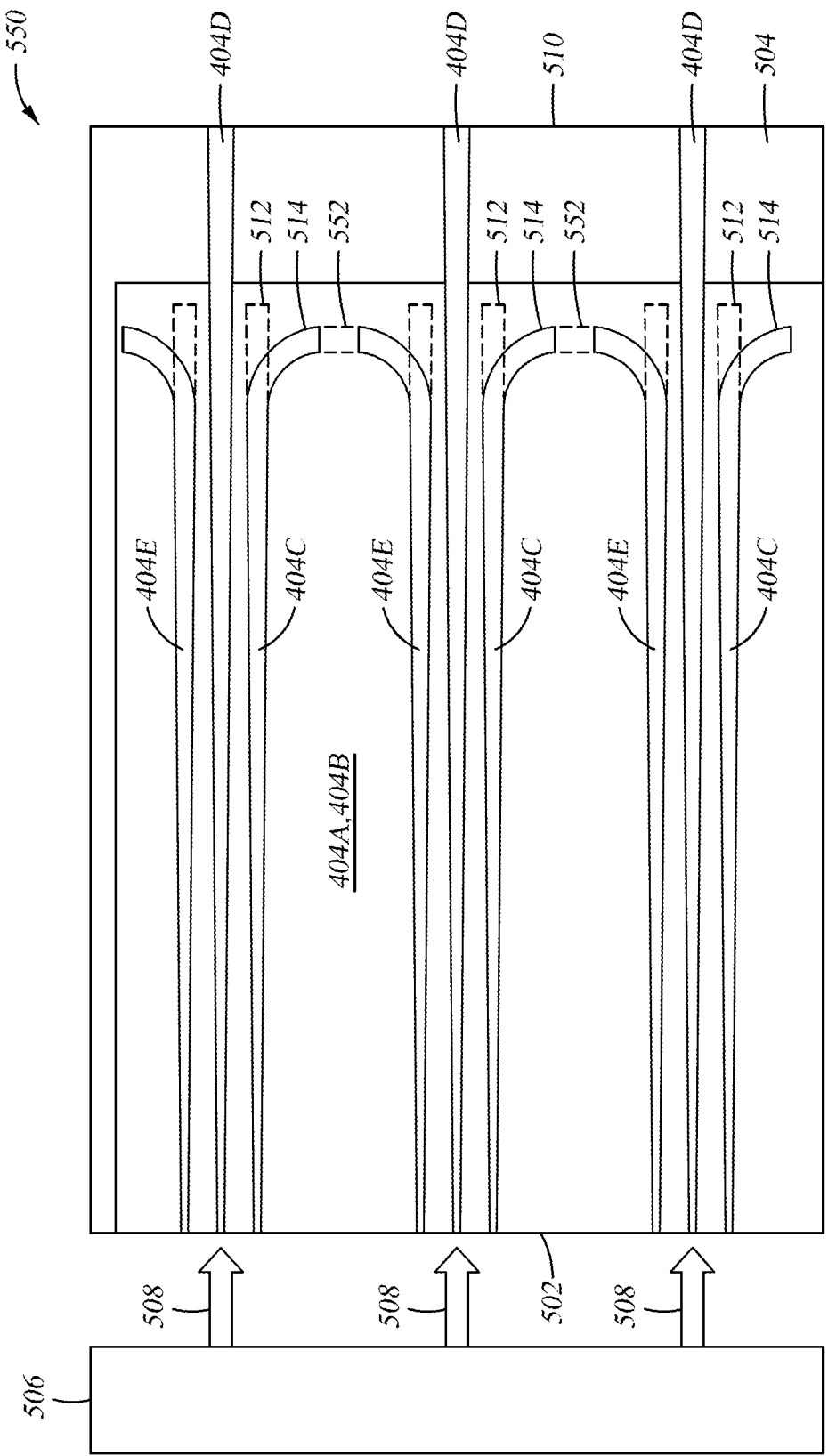

FIGS. 5A and 5B are schematic illustrations of waveguide structures 500, 550 according to various embodiments. FIG. 5A illustrates a top view of a structure 500 having multiple split assist core structures. It is to be understood that while three split assist core structures 408 are shown, more split assist core structures 408 may be present. As shown in FIG. 5A, the slider has cladding material 504, and a top surface 502 of the slider faces the light source 506 which emits light 508 towards the slider. The main core 404D in each split assist core structure 408 is shown to be straight, but tapered with a width increasing from the top surface 502 towards the bottom surface 510. The side cores 404C, 404E may also be tapered with a width increasing from the top surface 502 towards the bottom surface 510. However, the ends of both side cores 404C, 404E may be either straight ends 512 as shown in dashed lines or curved ends 514. The light traveling through the side cores 404C, 404E does not typically couple to the main core 404D perfectly, and some of the light is reflected at the end of the side cores 404C, 404E and goes back to the light source 506 when the side cores 404C, 404E have straight ends 512. The reflected light influences the light emission of the VCSEL and caused a change in output power. By making the end of the core curved, the reflection may be reduced. The radius of curvature R for the curved ends 514 may be between about 2 micrometers to about 20 micrometers. As also shown in FIG. 5A, the main core 404D extends from the top surface 502 to the bottom surface 510, but the side cores 404C, 404E top core 404A, and bottom core 404E extend from the top surface 502 to a location recessed from the bottom surface 510.

FIG. 5B, by contrast, illustrates both a top view of a structure 550 having multiple split assist core structures 408 with a common top assist core 404A and bottom assist core 404B. Additionally, FIG. 5B illustrates a potential connected situation where the curved ends 514 of adjacent side assist cores 404C, 404E can be connected at joining region 552.

Figure 6A:
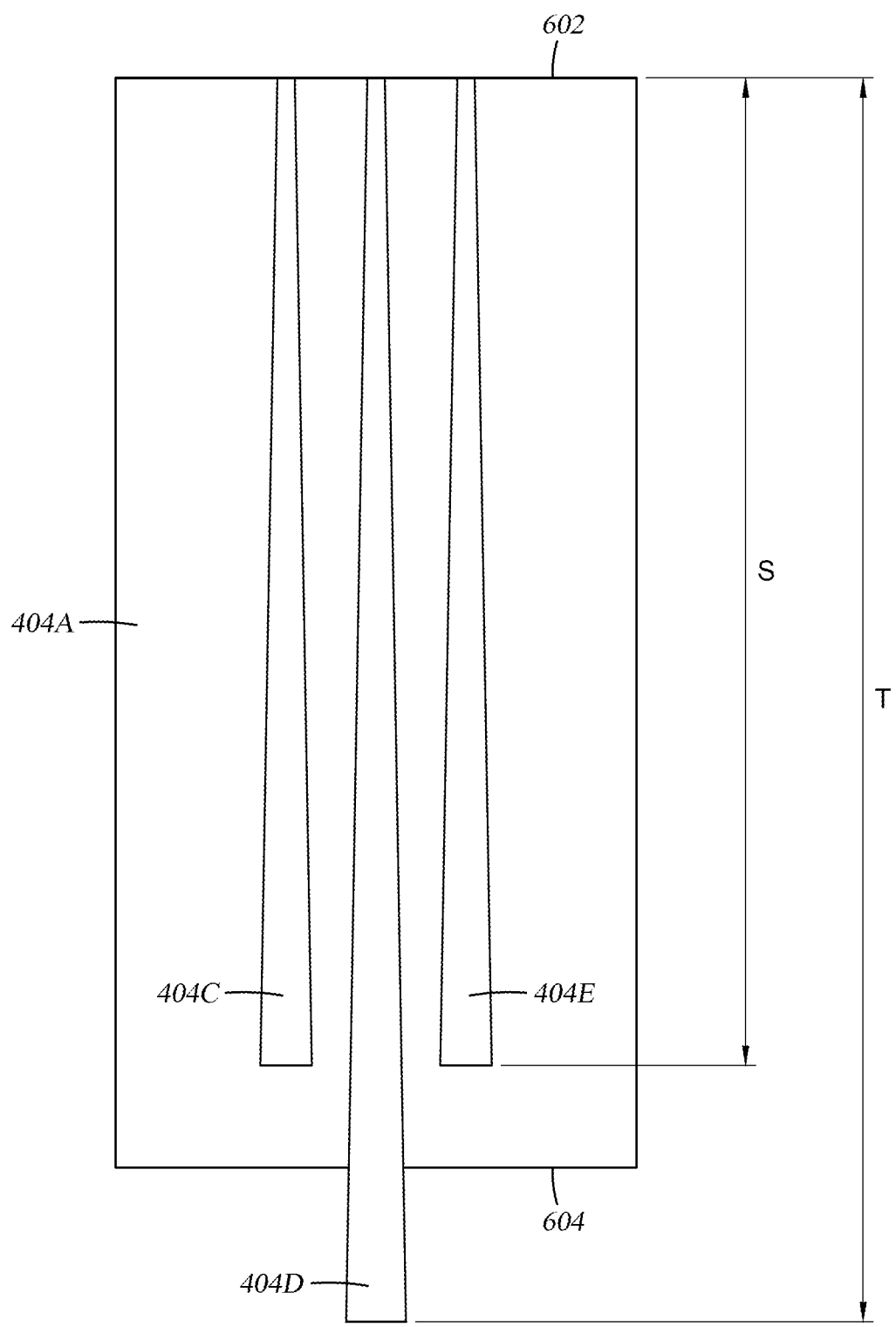
FIGS. 6A-6C are schematic side view illustrations of SSCs of FIGS. 4A-4G according to various embodiments.
Figure 6B:
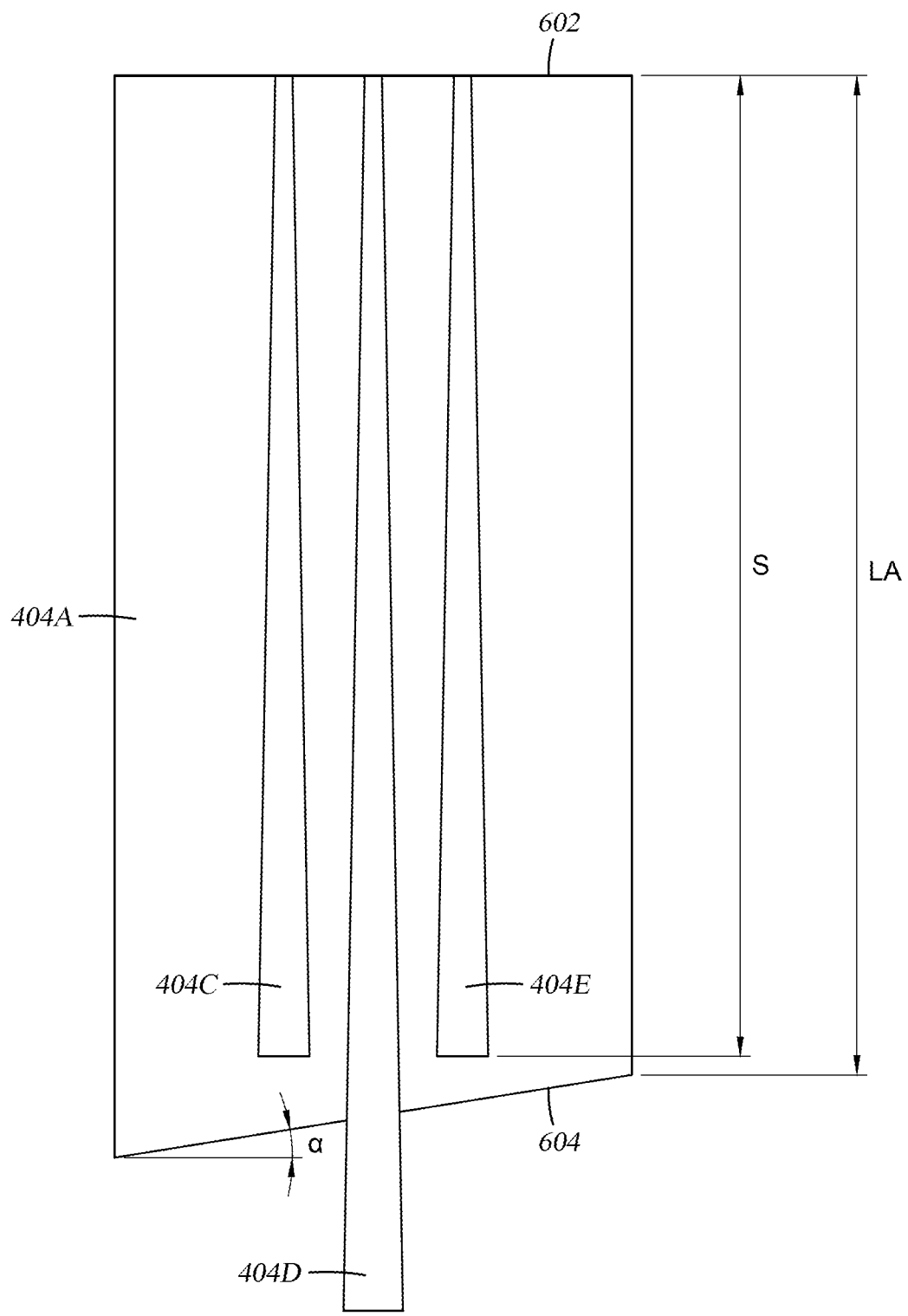
Figure 6C:
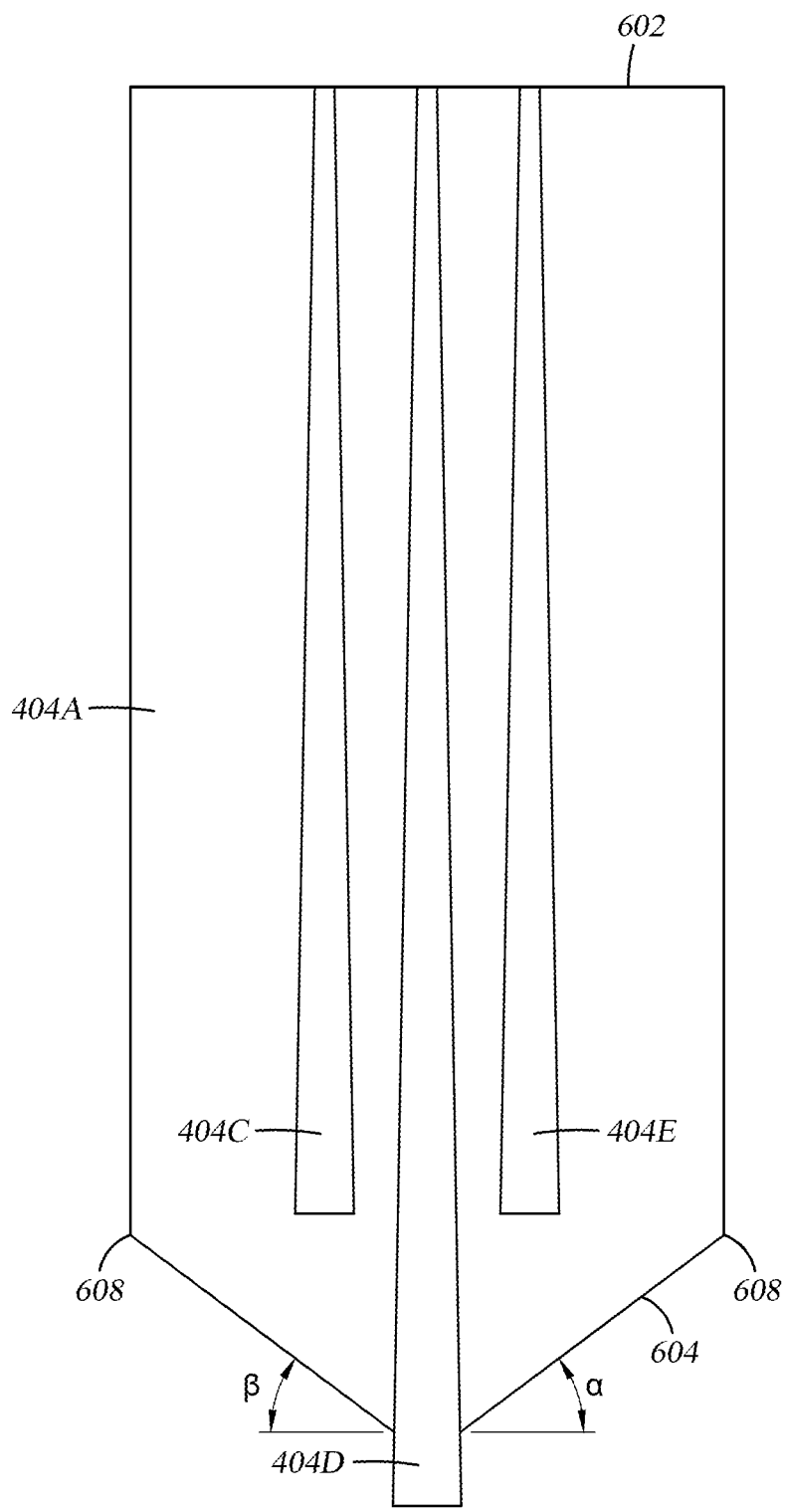
Figure 8A:
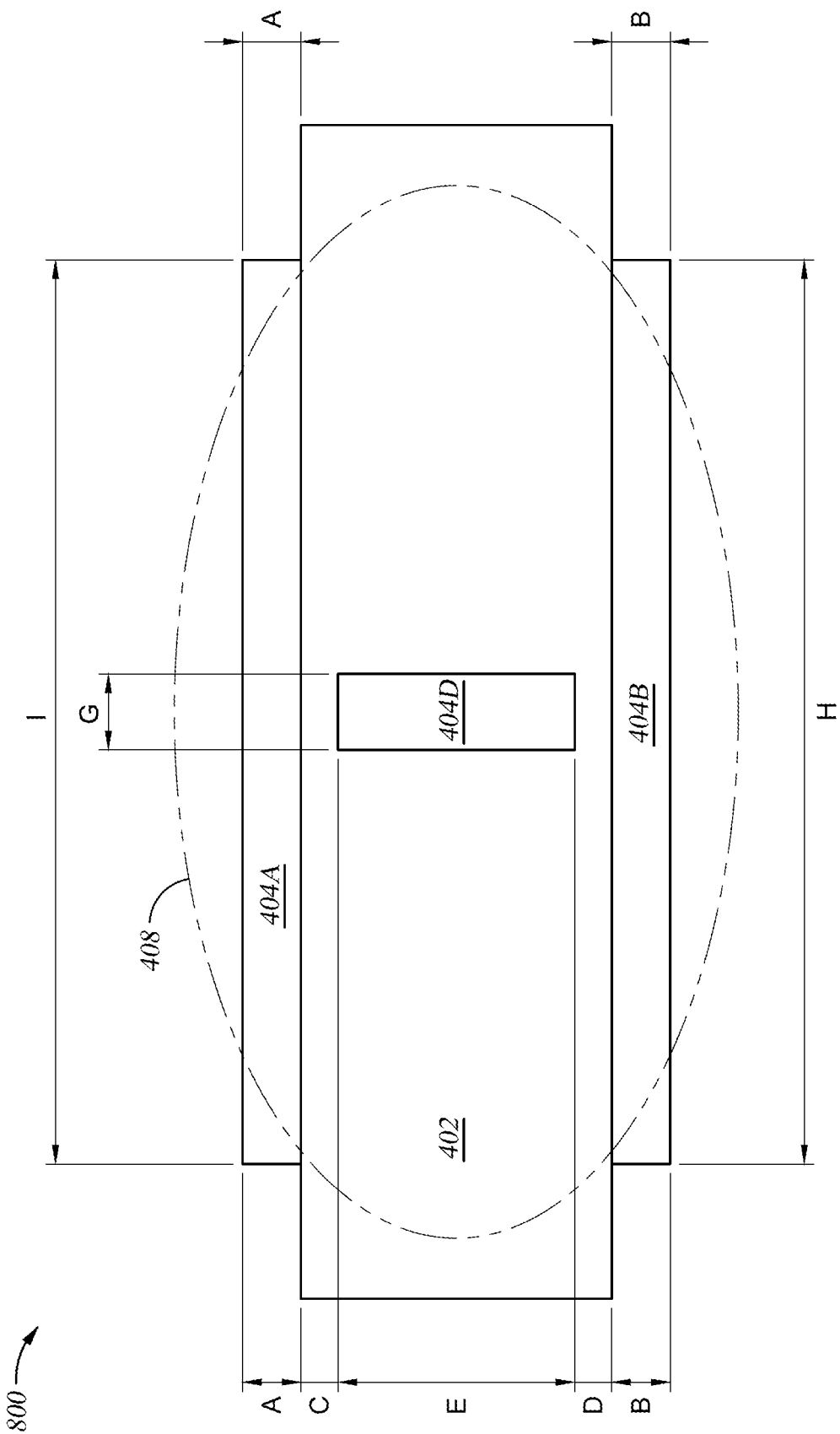
FIGS. 8A-8G are schematic cross-sectional illustrations of SSCs according to various embodiments.
Figure 8B:
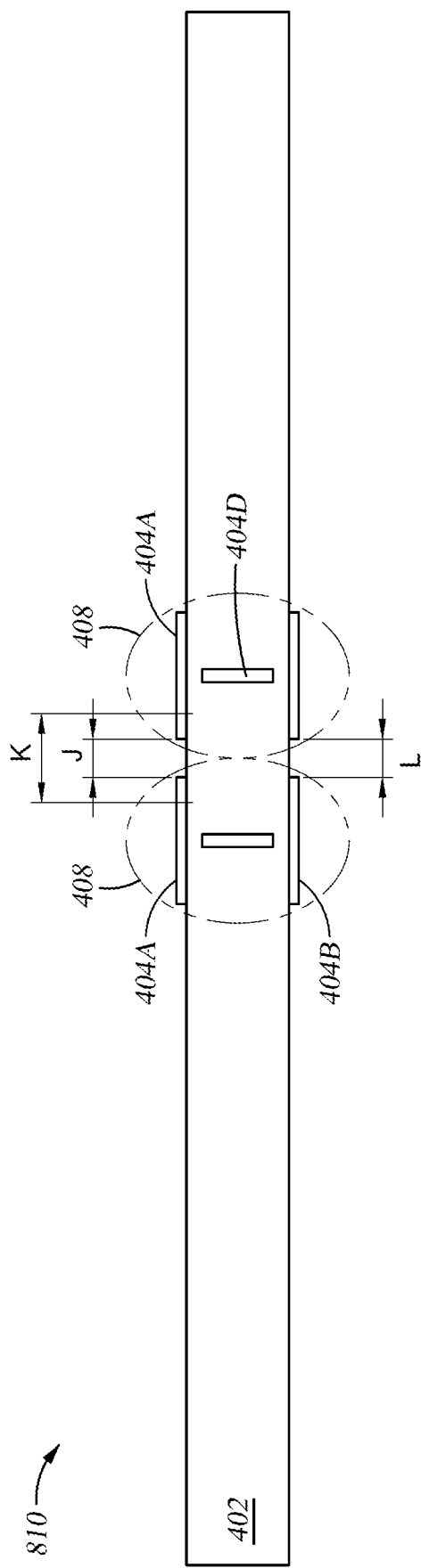
Figure 8C:
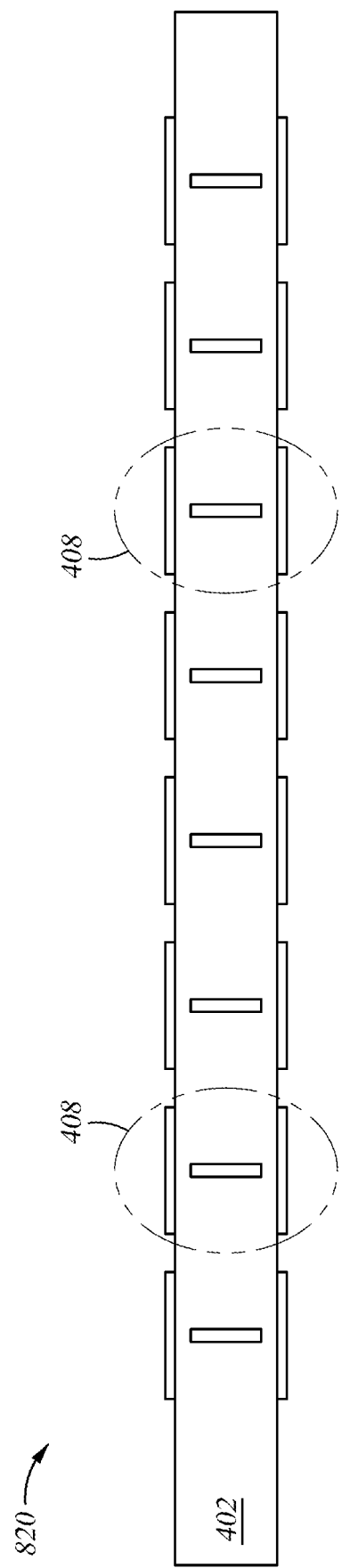
Figure 8D:
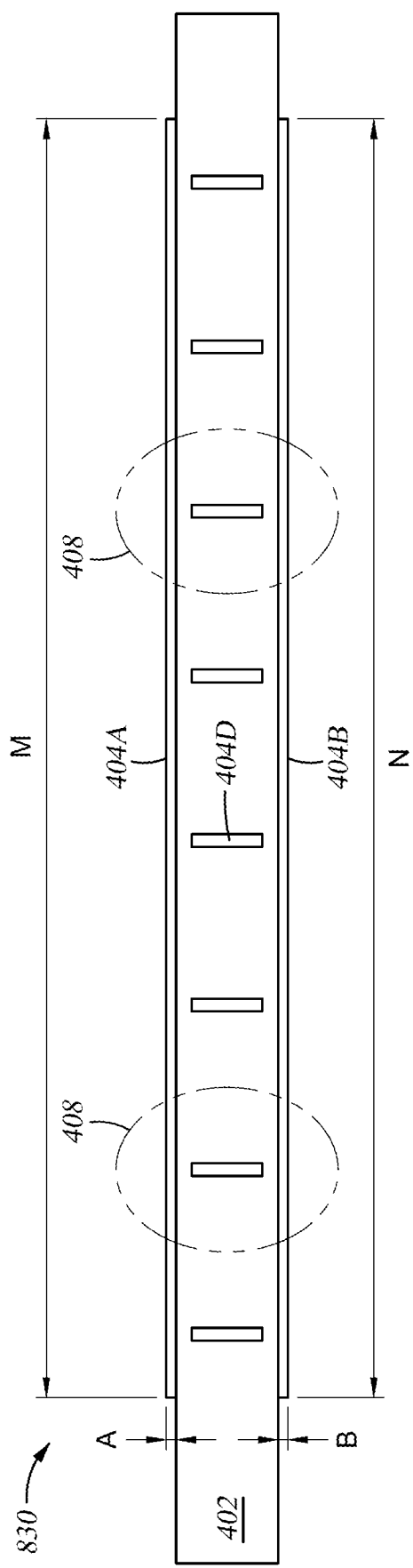
Figure 8E:
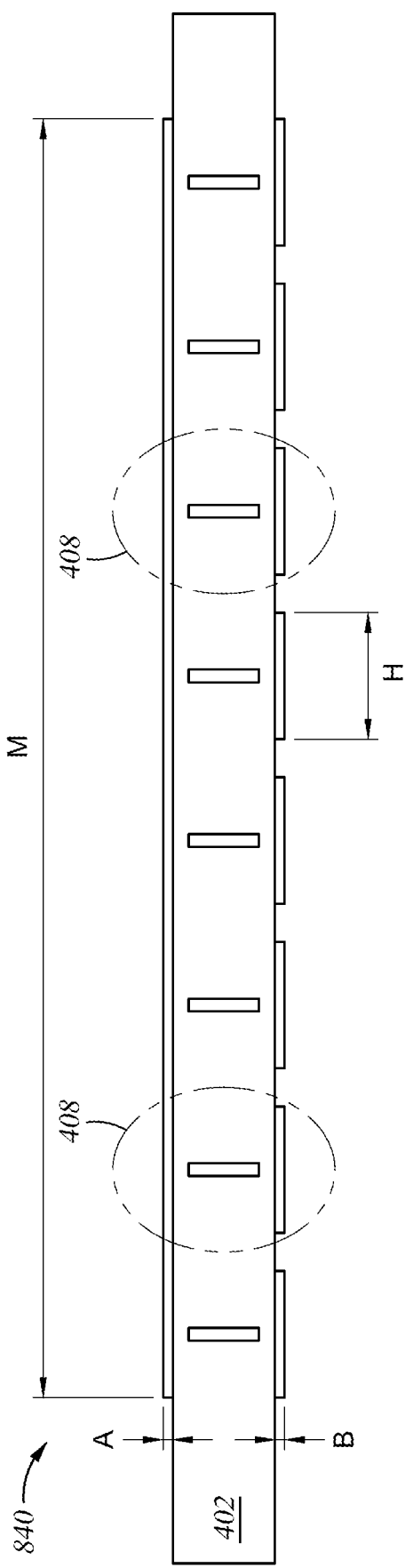
Figure 8F:
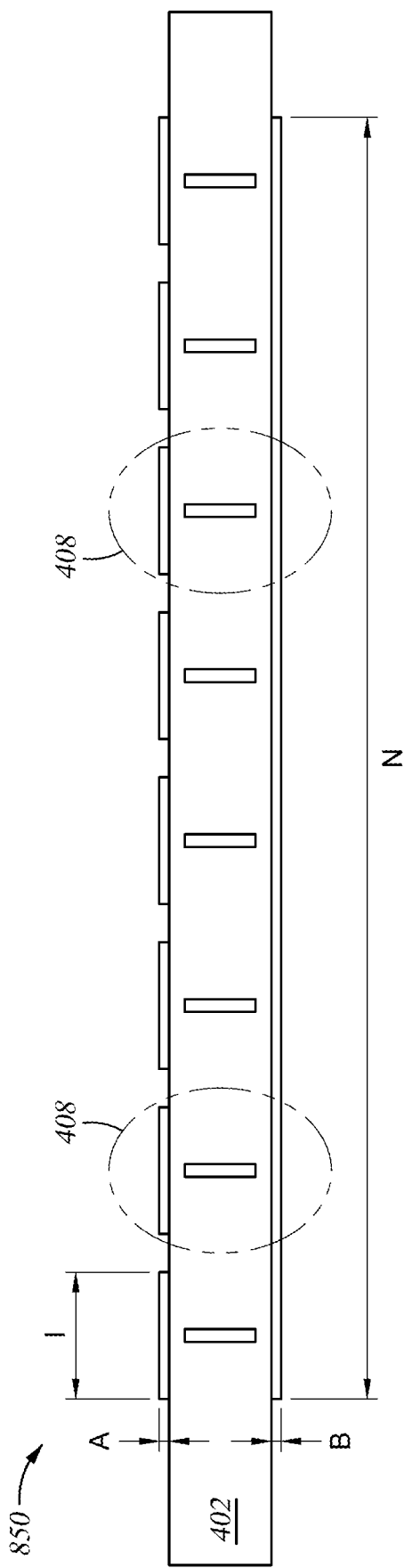
Figure 8G:
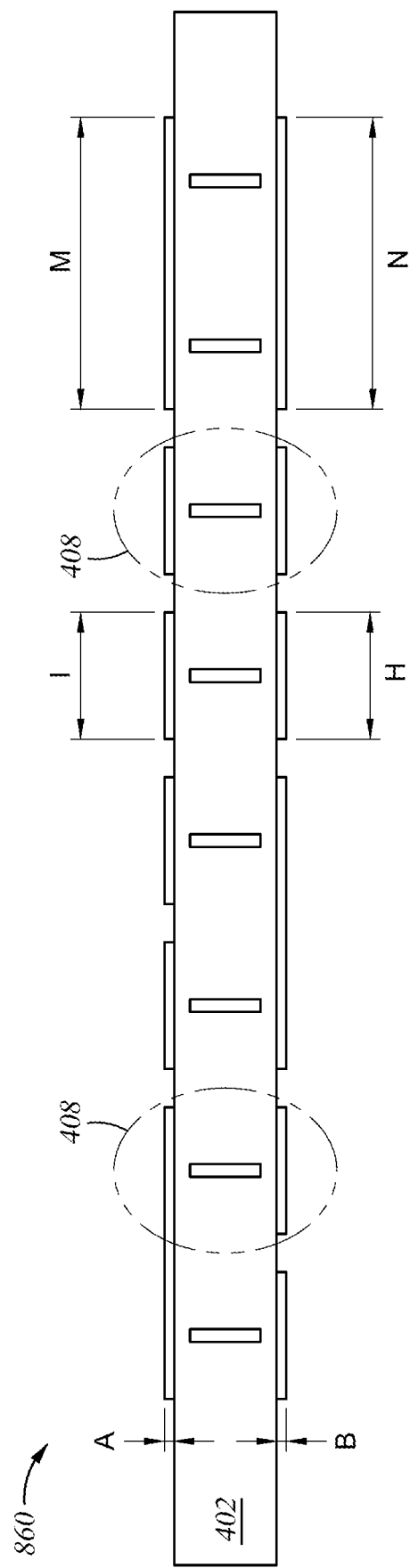

FIGS. 6A-6C are schematic side view illustrations of SSCs of FIGS. 4A-4G according to various embodiments. As shown in FIGS. 6A-6C, the main waveguide 404D extends a distance T from the surface 602 opposite the MFS while the side waveguides 404C, 404E each extends a distance S that is less than the distance T. It is to be understood that bottom assist core 404B is not shown for clarity but would have the same shape as the top assist core 404A. The reason that the side waveguides 404C, 404E do not extend as far as the main waveguide 404D is that by the time the light has traveled the distance S in the side waveguides 404C, 404E, the any light that is going to couple to the main waveguide 404D has already coupled into the main waveguide 404D from the side waveguides 404C, 404E. Hence, while the wide waveguides 404C, 404E may have the same length as the main waveguide 404D, the length of the side waveguides 404C, 404E need not be as long as the main waveguide 404D. As shown in FIG. 6A, the surface 604 opposite surface 602 is substantially parallel to surface 602. As shown in FIG. 6B, the top assist core 404A is shown to have an angled surface 604 facing the MFS. The surface 604 is at an angle $\alpha$ of between about 5 degrees and about 70 degrees. The surface 604 is angled because the light traveling through the assist cores 404A, 404B does not typically couple to the main waveguide 404D perfectly and some of the light is reflected back to the light source if the end of the core is not at an angle. The angle helps couple as much light as possible from the assist cores 404A, 404B to the main waveguide 404D. The reflected light influences the light emission of the VCSEL and causes a change in output power of the light source. The angle reduces the reflection.

As shown in FIG. 6C, rather than having the surface 604 angled, the surface 604 is tapered from the edges 608 of the surface 604 of the top assist core 404A away from the surface 602. The edges 608 are disposed at the same distance S from the surface 602 as the side waveguides 404C, 404E. The tapering is at angles $\alpha$ or $\beta$ where a is as discussed above and B may be between about 5 degrees to about 70 degrees. When the end of the top or bottom assist core 404A, 404B is tapered or at an angle, the length of the shortest point of the top or bottom assist cores 404A, 404B should be larger than the length of the side cores 404C, 404E shown by S.

FIGS. 7A and 7B are schematic illustrations of waveguides having tapers according to various embodiments. In FIGS. 7A and 7B, the main waveguide 404D is exemplified, but it is to be understood that the tapering is applicable to the side waveguides 404C, 404E as well. The tapering occurs from a first end 702 of the main waveguide 404D to the second end 704 of the main waveguide 404D. The first end 702 has a width U of between about 50 nm and about 100 nm, while the second end 704 has a width V of between about 300 nm and about 800 nm, such as about 600 nm. Between the first end 702 and the second end 704 the waveguide has a linear tapering as shown in FIG. 7A or a non-linear tapering as shown in FIG. 7B. The tapering assists in focusing the light as the light moves from the source to the NFT.

FIGS. 8A-8G are schematic cross-sectional illustrations SSCs 800, 810, 820, 830, 840, 850, 860 according to various embodiments. The SSCs of FIGS. 8A-8G are substantially identical to the SSCs of FIGS. 4A-4G except that rather than having side waveguides 404C, 404E and main waveguide 404D, the SSCs of FIGS. 8A-8G have the main waveguide 404D and do not have the side waveguides 404C, 404E.

Figure 9A:
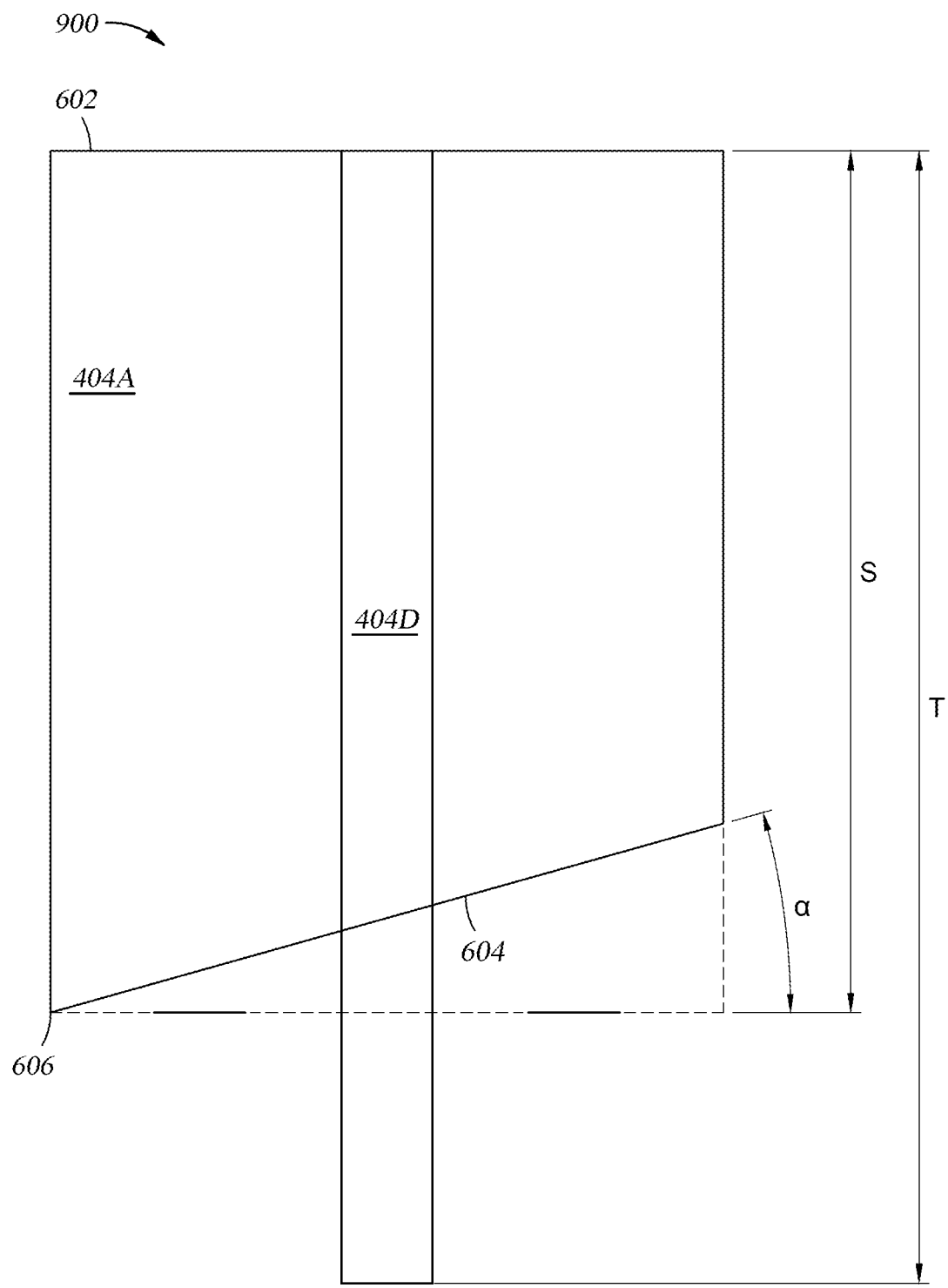
FIGS. 9A and 9B are schematic side view illustrations of SSCs of FIGS. 8A-8G according to various embodiments.
Figure 9B:
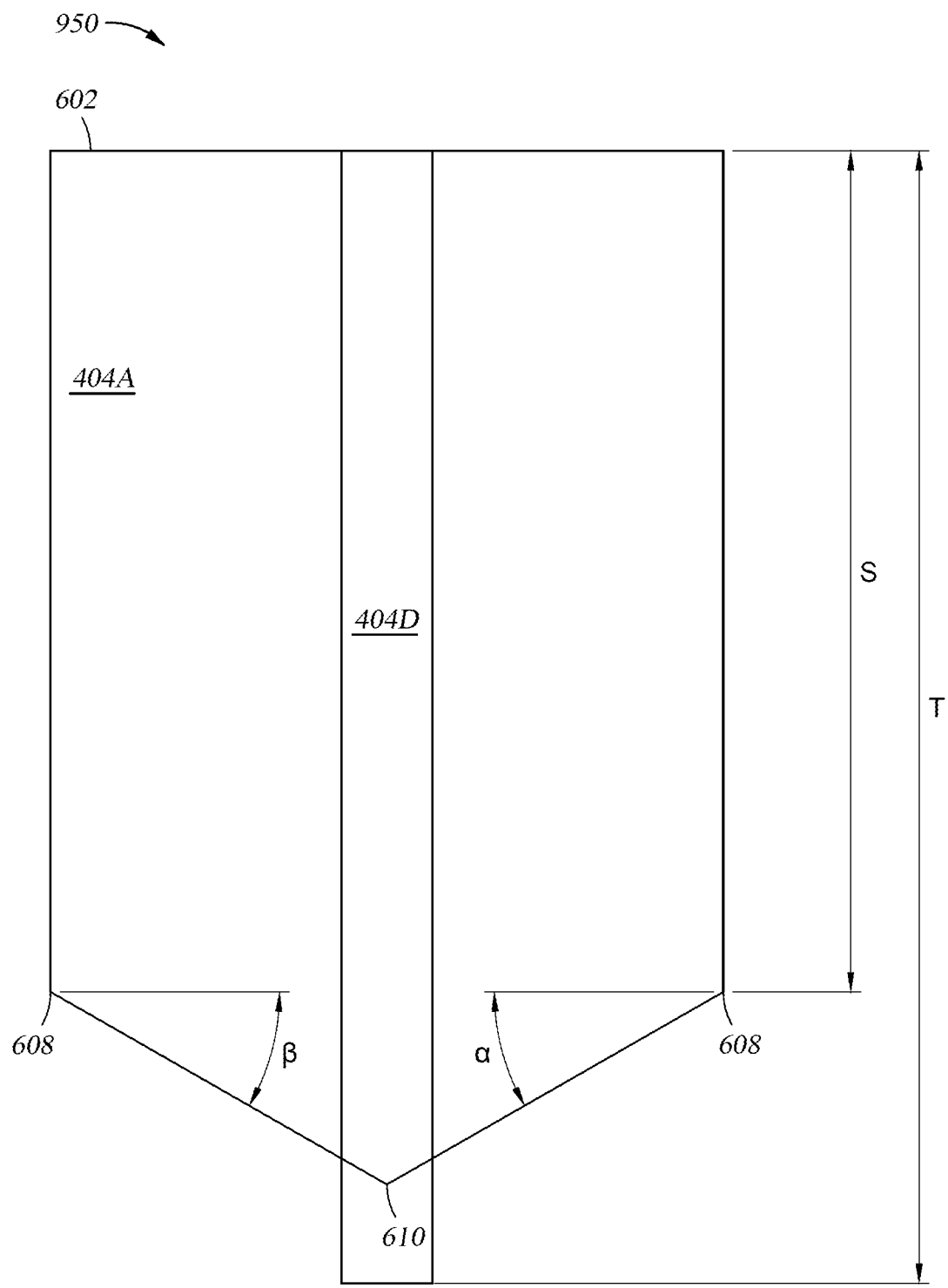

FIGS. 9A and 9B are schematic side view illustrations of SSCs of FIGS. 8A-8G according to various embodiments. The SSCs of FIGS. 9A and 9B are substantially identical to the SSCs of FIGS. 6A and 6B except that rather than having side waveguides 404C, 404E and main waveguide 404D, the SSCs of FIGS. 9A and 9B have the main waveguide 404D and do not have the side waveguides 404C, 404E.

By utilizing multiple split assist core structures in the SSC, coupling efficiency between the light source and the SSC is improved as light source operating temperature can be stabilized, light source lifetime can increase, light source stability can occur, and slider operating temperature can be stabilized.

In one embodiment, a magnetic recording head assembly comprises: a main pole; a near field transducer (NFT) disposed adjacent to the main pole; and a spot size converter coupled to the NFT, wherein the spot size converter comprises: a first waveguide coupled to the NFT; a multimodal interference (MMI) device having a first end and a second end, wherein the first end is coupled to the first waveguide; and a plurality of split assist core structures coupled to the second end, wherein the plurality of split assist core structures extend from the MMI device to a top surface of the head assembly, the top surface being opposite a media facing surface (MFS) of the head assembly, and wherein each split assist core structure comprises a main waveguide and a plurality of assist cores. The magnetic recording head assembly further comprising a vertical cavity surface emitting laser (VCSEL) device coupled to the top surface, the VCSEL device comprising a plurality of output apertures each coupled with one of the plurality of split assist core structures. In at least one split assist core structure, the plurality of assist cores comprise a first assist core and a second assist core, wherein the main waveguide of the at least one assist core is disposed between the first assist core and the second assist core. At least a first split assist core structure and a second split assist core structure of the plurality of split assist core structures share an assist core. The main waveguide is tapered from the top surface of the head assembly to the second end. The tapering is linear tapering. At least one split assist core structure comprises: a main waveguide; one or more side waveguides; and the plurality of assist cores including: a top assist core; and a bottom assist core, wherein the main waveguide and the one or more side waveguides are disposed between the top assist core and the bottom assist core. The main waveguide has a length extending between the top surface of the head assembly and the second end, and wherein the length is greater than a length of the one or more side waveguides extending between the top surface of the head assembly and the second end. The one or more side waveguides has a curved end. The assist core has a surface facing the MFS, and wherein the surface is disposed at an angle relative to the MFS. The main waveguide is spaced from the assist core by cladding material. The cladding material comprises one or more of the following materials $Ta_2O_5$, $TiO_2$, $Nb_2O_5$, $SiO_xN_y$, $Al_2O_3$, and Ge doped $SiO_2$. A magnetic media device comprising the magnetic recording head assembly is also disclosed.

In another embodiment, a spot size converter comprises: a waveguide; a multimodal interference (MMI) device having a first end and a second end, wherein the first end is coupled to the first waveguide; a first main waveguide coupled to the second end and extending to a third end opposite the second end; a second main waveguide coupled to the second end and extending to the third end; and a plurality of assist cores, wherein a first assist core of the plurality of assist cores extends from the third end towards the second end and wherein the first assist core is spaced from both the first main waveguide and the second main waveguide by cladding material. The spot size converter further comprises a second assist core, wherein the second assist core extends from the third end towards the second end and wherein the second assist core is spaced from both the first main waveguide and the second main waveguide by the cladding material. One or more of the first assist core and the second assist core extends to a location spaced from the second end. The first main waveguide has a first width and a first height, wherein the first assist core has a second width parallel to the first width and a second height parallel to the first height, wherein the first width is less than the second width, and wherein the first height is greater than the second height. A magnetic media device comprising the spot size converter is also disclosed.

In another embodiment, a magnetic recording head comprises: a near field transducer; and a spot size converter, comprising: a first waveguide having a first surface that is coupled with the near field transducer; a multimodal interference (MMI) device having a first end and a second end, wherein the first end is coupled to the first waveguide; and a plurality of split assist core structures comprising: a first assist core; a second assist core; and a main waveguide coupled between the first assist core and the second assist core, wherein the main waveguide extends from the second end to a surface opposite a media facing surface (MFS), and wherein the main waveguide is disposed between the first assist core and the second assist core, wherein the first assist core, the second assist core, and that main waveguide each includes a first material. The first assist core, the second assist core, and the main waveguide are spaced apart by a second material that is different than the first material. A magnetic media device comprising the magnetic recording head is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head assembly, comprising:
a main pole;
a near field transducer (NFT) disposed adjacent to the main pole; and
a spot size converter coupled to the NFT, wherein the spot size converter comprises:
a first waveguide coupled to the NFT;
a multimodal interference (MMI) device having a first end and a second end, wherein the first end is coupled to the first waveguide; and
a plurality of split assist core structures coupled to the second end, wherein the plurality of split assist core structures extend from the MMI device to a top surface of the head assembly, the top surface being opposite a media facing surface (MFS) of the head assembly, and wherein each split assist core structure comprises a main waveguide and a plurality of assist cores.

2. The magnetic recording head assembly of claim 1, further comprising a vertical cavity surface emitting laser (VCSEL) device coupled to the top surface, the VCSEL device comprising a plurality of output apertures each coupled with one of the plurality of split assist core structures.

3. The magnetic recording head assembly of claim 1, wherein in at least one split assist core structure, the plurality of assist cores comprise a first assist core and a second assist core, wherein the main waveguide of the at least one assist core is disposed between the first assist core and the second assist core.

4. The magnetic recording head assembly of claim 1, wherein at least a first split assist core structure and a second split assist core structure of the plurality of split assist core structures share an assist core.

5. The magnetic recording head assembly of claim 1, wherein the main waveguide is tapered from the top surface of the head assembly to the second end.

6. The magnetic recording head assembly of claim 5, wherein the tapering is linear tapering.

7. The magnetic recording head assembly of claim 1, wherein at least one split assist core structure comprises:
a main waveguide;
one or more side waveguides; and
the plurality of assist cores including:
a top assist core; and
a bottom assist core, wherein the main waveguide and the one or more side waveguides are disposed between the top assist core and the bottom assist core.

8. The magnetic recording head assembly of claim 7, wherein the main waveguide has a length extending between the top surface of the head assembly and the second end, and wherein the length is greater than a length of the one or more side waveguides extending between the top surface of the head assembly and the second end.

9. The magnetic recording head of claim 8, wherein the one or more side waveguides has a curved end.

10. The magnetic recording head assembly of claim 1, wherein the assist core has a surface facing the MFS, and wherein the surface is disposed at an angle relative to the MFS.

11. The magnetic recording head assembly of claim 1, wherein the main waveguide is spaced from the assist core by cladding material.

12. The magnetic recording head assembly of claim 11, wherein the cladding material comprises one or more of the following materials $Ta_2O_5$, $TiO_2$, $Nb_2O_5$, $SiO_xN_y$, $Al_2O_3$, and Ge doped $SiO_2$.

13. A magnetic media device comprising the magnetic recording head assembly of claim 1.

14. A spot size converter, comprising:
a waveguide;
a multimodal interference (MMI) device having a first end and a second end, wherein the first end is coupled to the waveguide;
a first main waveguide coupled to the second end and extending to a third end opposite the second end;
a second main waveguide coupled to the second end and extending to the third end; and
a plurality of assist cores, wherein a first assist core of the plurality of assist cores extends from the third end towards the second end and wherein the first assist core is spaced from both the first main waveguide and the second main waveguide by cladding material.

15. The spot size converter of claim 14, wherein the plurality of assist cores further comprises a second assist core, wherein the second assist core extends from the third end towards the second end and wherein the second assist core is spaced from both the first main waveguide and the second main waveguide by the cladding material.

16. The spot size converter of claim 15, wherein one or more of the first assist core and the second assist core extends to a location spaced from the second end.

17. The spot size converter of claim 14, wherein the first main waveguide has a first width and a first height, wherein the first assist core has a second width parallel to the first width and a second height parallel to the first height, wherein the first width is less than the second width, and wherein the first height is greater than the second height.

18. A magnetic media device comprising the spot size converter of claim 14.

19. A magnetic recording head, comprising:
a near field transducer; and
a spot size converter, comprising:
a first waveguide having a first surface that is coupled with the near field transducer;
a multimodal interference (MMI) device having a first end and a second end, wherein the first end is coupled to the first waveguide; and
a plurality of split assist core structures comprising:
a first assist core;
a second assist core; and
a main waveguide coupled between the first assist core and the second assist core, wherein the main waveguide extends from the second end to a surface opposite a media facing surface (MFS), and wherein the main waveguide is disposed between the first assist core and the second assist core, wherein the first assist core, the second assist core, and that main waveguide each includes a first material.

20. The magnetic recording head of claim 19, wherein the first assist core, the second assist core, and the main waveguide are spaced apart by a second material that is different than the first material.

21. A magnetic media device comprising the magnetic recording head of claim 19.

* * * * *